US009535841B2

(12) United States Patent
Hirao et al.

(10) Patent No.: US 9,535,841 B2
(45) Date of Patent: Jan. 3, 2017

(54) CACHE MEMORY AND CACHE MEMORY CONTROL UNIT

(75) Inventors: Taichi Hirao, Tokyo (JP); Hiroaki Sakaguchi, Kanagawa (JP); Hiroshi Yoshikawa, Kanagawa (JP); Masaaki Ishii, Saitama (JP)

(73) Assignee: SONY CORPORATION, Tokyo (JP)

( * ) Notice: Subject to any disclaimer, the term of this patent is extended or adjusted under 35 U.S.C. 154(b) by 960 days.

(21) Appl. No.: 13/515,315

(22) PCT Filed: Dec. 14, 2010

(86) PCT No.: PCT/JP2010/072475
§ 371 (c)(1),
(2), (4) Date: Sep. 12, 2012

(87) PCT Pub. No.: WO2011/078014
PCT Pub. Date: Jun. 30, 2011

(65) Prior Publication Data
US 2012/0331234 A1 Dec. 27, 2012

(30) Foreign Application Priority Data

Dec. 21, 2009 (JP) .............................. P2009-288647
Dec. 21, 2009 (JP) .............................. P2009-288648
(Continued)

(51) Int. Cl.
*G06F 13/00* (2006.01)
*G06F 12/08* (2016.01)

(52) U.S. Cl.
CPC .................................. *G06F 12/084* (2013.01)

(58) Field of Classification Search
None
See application file for complete search history.

(56) References Cited

U.S. PATENT DOCUMENTS 5,944,815 A * 8/1999 Witt ........................ G06F 9/383
711/E12.07
6,868,472 B1 * 3/2005 Miyake ............... G06F 12/0802
711/118
(Continued)

FOREIGN PATENT DOCUMENTS

JP 2000 10862 1/2000
JP 2002 236614 8/2002
(Continued)

OTHER PUBLICATIONS

International Search Report Issued Feb. 15, 2011 in PCT/JP10/072475 Filed Dec. 14, 2010.

*Primary Examiner* — Charles Rones
*Assistant Examiner* — Han Doan
(74) *Attorney, Agent, or Firm* — Chip Law Group

(57) ABSTRACT

Data transfer between processors is efficiently performed in a multiprocessor including a shared cache memory. Each entry in a tag storage section 220 of a cache memory holds a reference number field 224 in addition to a tag address field 221, a valid field 222, and a dirty field 223. The reference number field 224 is set in a data write, and the value thereof is decremented after each read access. When the value of the reference number field 224 is changed from "1" to "0", the entry is invalidated without performing a write-back operation. When the cache memory is used for communication between processors in the multiprocessor system, the cache memory functions as a shared FIFO, and used data is automatically deleted.

19 Claims, 41 Drawing Sheets

(30) Foreign Application Priority Data

Dec. 21, 2009 (JP) ................................ P2009-288649
Sep. 22, 2010 (JP) ................................ P2010-212516

(56) References Cited

U.S. PATENT DOCUMENTS

| | | | |
|---|---|---|---|
| 8,145,768 B1* | 3/2012 | Hawthorne | H04L 63/166 709/205 |
| 2002/0056026 A1* | 5/2002 | Matsuyama | G06F 12/0862 711/136 |
| 2003/0182523 A1 | 9/2003 | Kokubo | |
| 2003/0217232 A1* | 11/2003 | Audityan | G06F 12/0835 711/141 |
| 2004/0177225 A1* | 9/2004 | Furtek et al. | 711/149 |
| 2005/0275658 A1 | 12/2005 | Sasaki et al. | |
| 2007/0233960 A1* | 10/2007 | Yamato | G06F 12/0886 711/123 |
| 2007/0271407 A1* | 11/2007 | Yap | G06F 9/3802 710/315 |
| 2007/0282838 A1* | 12/2007 | Shavit | G06F 9/3004 |
| 2008/0065794 A1* | 3/2008 | Lee | G06F 13/28 710/24 |
| 2009/0182948 A1* | 7/2009 | Jiao | G06F 12/084 711/133 |

FOREIGN PATENT DOCUMENTS

| | | |
|---|---|---|
| JP | 2003 30051 | 1/2003 |
| JP | 2003 248625 | 9/2003 |
| JP | 2003 271455 | 9/2003 |
| JP | 2004 355365 | 12/2004 |
| JP | 2005 346215 | 12/2005 |
| JP | 2009 15509 | 1/2009 |
| JP | 2009 37615 | 2/2009 |

\* cited by examiner

FIG. 4

MAIN MEMORY 300

| 0x00000000 | 0x0002000 | ... | 0xfffe000 |
| 0x00000040 | 0x0002040 | ... | 0xfffe040 |
| 0x00000080 | 0x0002080 | ... | 0xfffe080 |
| 0x000000c0 | 0x00020c0 | ... | 0xfffe0c0 |
| 0x00000100 | 0x0002100 | ... | 0xfffe100 |
| ... | ... | ... | ... |
| 0x0001fc0 | 0x0003fc0 | ... | 0xffffc0 |

DATA STORAGE SECTION 240

|   | way #0 | way #1 |
|---|---|---|
| 0 | 0b0 0000 0000 0000 0000 | 0b0 0000 0000 0000 0000 |
| 1 | 0b0 0000 0100 0000 0000 | 0b0 0000 0100 0000 0000 |
| 2 | 0b0 0000 1000 0000 0000 | 0b0 0000 1000 0000 0000 |
| 3 | 0b0 0000 1100 0000 0000 | 0b0 0000 1100 0000 0000 |
| 4 | 0b0 0001 0000 0000 0000 | 0b0 0001 0000 0000 0000 |
| ... | ... | ... |
| 127 | 0b1 1111 1100 0000 0000 | 0b1 1111 1100 0000 0000 | fifo_write_byte_with_offset (data2, +1)
fifo_write_byte_with_offset (data1, −1)
(a) WRITE SIDE
data1 = fifo_read_byte()
data2 = fifo_read_byte()
(b) READ SIDE
FIG. 33 fifo_write_byte(data1)
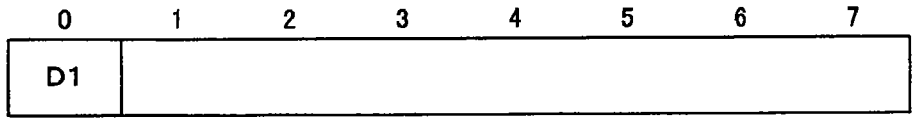
fifo_write_half(data2)
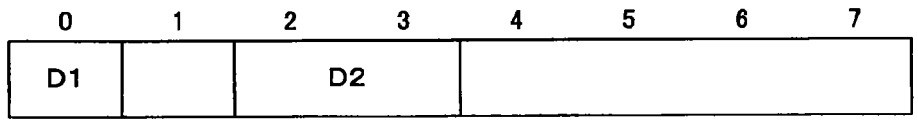
fifo_write_byte(data3)
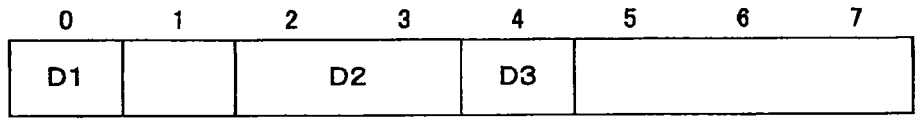
(a) WRITE WITHOUT CHANGE IN WRITE ORDER
fifo_write_byte(data1)
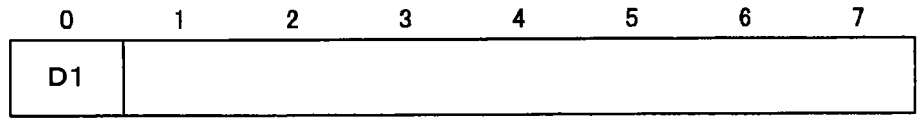
fifo_write_half(data2)
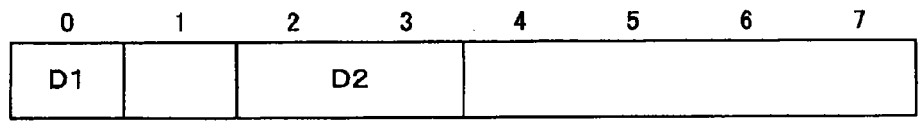
fifo_write_byte_with_offset(data3, −3)
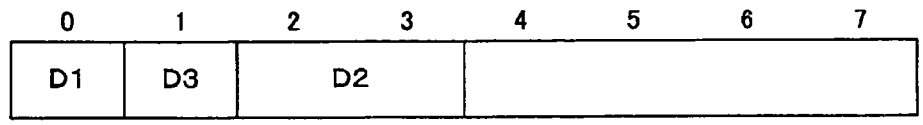
(b) WRITE WITH CHANGE IN WRITE ORDER
FIG. 34

```
1   /* IDCT COEFFICIENT DECODING PROCESS ALGORITHM OF TYPICAL CODEC */
2   void get_coeff (void)
3   {
4       short QFS[64];
5       int token;
6       int run, level;
7       int eob_not_read;
8       int m, n;
9       /* OBTAIN IDCT COEFFICIENT FROM BIT STREAM */
10      eob_not_read = 1;
11      n = 0;
12      while (eob_not_read) {
13          token = get_token (bit_stream);
14          if (end_of_block (token)) {
15              /* IF EOB IS DETECTED, SET REMAINING ELEMENT TO 0
16              eob_not_read = 0;                              AND END */
17              while (n < 64) {
18                  QFS[n] = 0;
19                  n++;
20              }
21          }
22          else {
23              run = get_run (token);
24              level = get_level (token);
25              for (m = 0; m < run; m++) {
26                  /* INSERT NUMBER OF 0S EQUEL TO NUMBER OF RUNS */
27                  QFS[n] = 0;
28                  n++;
29              }
30              QFS[n] = level;
31              n++;
32          }
33      }
34      /* ZIGZAG SCANNING ON IDCT COEFFICIENT AND OUTPUT IT TO FIFO */
35      for (n = 0; n < 64; n++) {
36          fifo_write_half (QFS[scan_table[n]]);
37      }
38  }
```

FIG. 35

```
1   /* OPTIMIZATION BY EXECUTING ZIGZAG SCANNING CONCURRENTLY WITH IDCT COEFFICIENT DECODING */
2   void get_coeff_opt (void)
3   {
4       short QF[64];
5       int token;
6       int run, level;
7       int m, n;
8       /* INITIALIZE ALL ELEMENTS */
9       for (n = 0; n < 64; n++) {
10          QF[n] = 0;
11      }
12      /* WRITE NONZERO COEFFICIENT ONLY */
13      n = 0;
14      while (1) {
15          token = get_token (bit_stream);
16
17          if (end_of_block (token)) {
18              break;
19          }
20          run = get_run (token);
21          level = get_level (token);
22          for (m = 0; m < run; m++) {
23              n++;
24          }
25          QF[scan_table[n]] = level;
26          n++;
27      }
28      /* OUTPUT RESULT TO FIFO */
29      for (n = 0; n < 64; n++) {
30          fifo_write_half (QF[n]);
31      }
32  }
```

FIG. 37

```
1   /* OPTIMIZATION WITH USE OF FIFO ACCORDING TO EMBODIMENTS OF PRESENT INVENTION */
2   void get_coeff_opt_fifo (void)
3   {
4       int token;
5       int run, level;
6       int m, n;
7       /* OUTPUT INITIALIZATION DATA TO FIFO ONCE */
8       for (n = 0; n < 64; n++) {
9           fifo_write_half (0);
10      }
11      /* WRITE NONZERO COEFFICIENT ONLY AGAIN */
12      n = 0;
13      while (1) {
14          token = get_token (bit_stream);
15          if (end_of_block (token)) {
16              break;
17          }
18          run = get_run (token);
19          level = get_level (token);
20          for (m = 0; m < run; m++) {
21              n++;
22          }
23          fifo_write_half_with_offset (level, scan_table[n] - 64);
24          n++;
25      }
26  }
```

FIG. 38

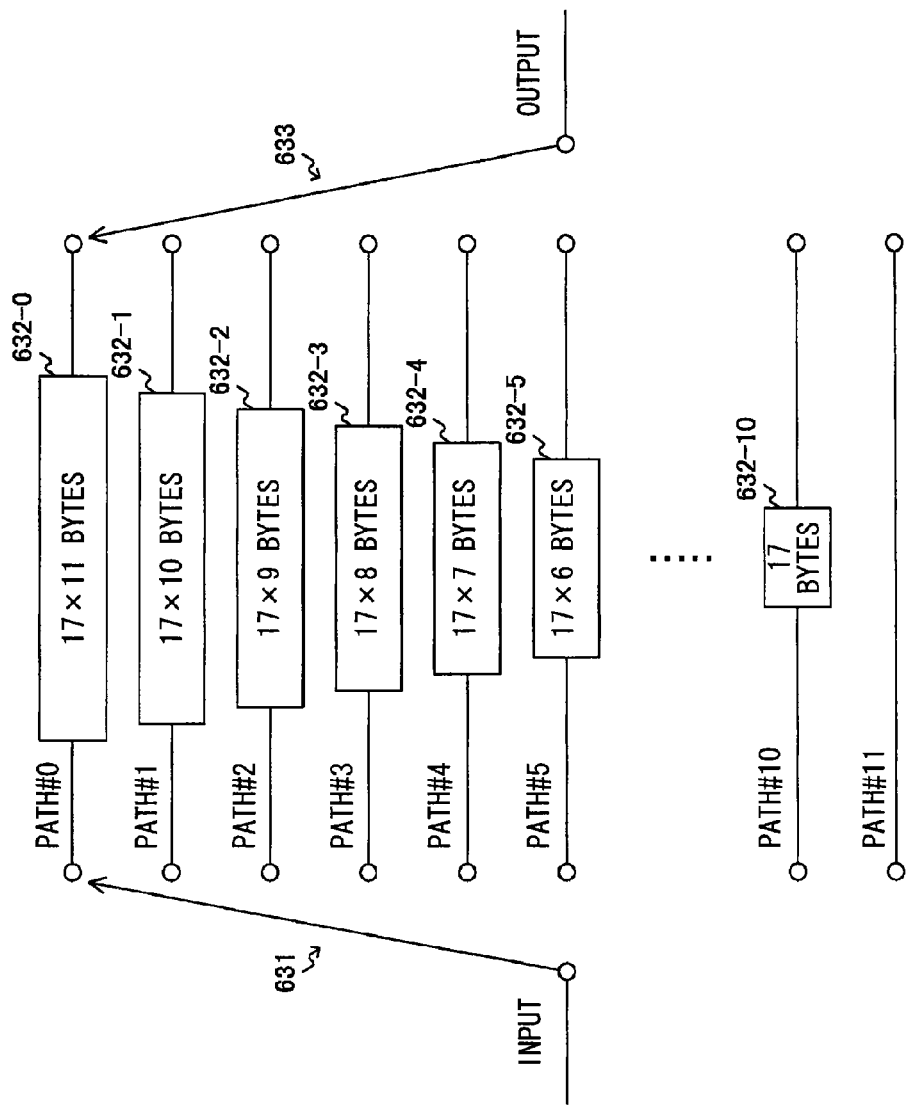

CACHE MEMORY AND CACHE MEMORY CONTROL UNIT

TECHNICAL FIELD

The present invention relates to a cache memory, and more specifically to a cache memory allowed to be used as a shared FIFO (First-In First-Out).

BACKGROUND ART

In multiprocessor systems, data transfer between processors may be necessary in the course of a process. In a multiprocessor system including a shared cache memory, it is considered to perform data transfer through the shared cache memory used as a shared FIFO. As a control technique for the shared cache memory in related art, the MESI protocol having four states, i.e., M (Modified), E (Exclusive), S (Shared), and I (Invalid) is known. More specifically, a need for a write-back to a main memory is allowed to be determined by controlling each cache line to be marked with one of the four states. As related art of this kind, for example, an inclusive shared cache among multiple core-cache clusters with use of the MESI protocol is proposed (for example, refer to PTL 1).

CITATION LIST

Patent Literature

[PTL 1] Japanese Unexamined Patent Application Publication No. 2009-037615 (Table 1)

SUMMARY OF THE INVENTION

In the above-described related art, after data is transferred between processors through the shared cache memory, to transfer another data with use of the same entry, it is necessary to write back the former data to a main memory or to invalidate the former data. In the former case, as a bus connected to the main memory is occupied to perform a write-back process, an influence may be exerted on other processors. Moreover, in the latter case, there is an issue that it is necessary to explicitly issue an invalidation instruction to the shared cache memory, thereby causing an increase in the number of processing cycles in the processors.

Moreover, in the above-described related art, when data is transferred between the processors through the shared cache memory, it is necessary to separately execute synchronization between the processors. More specifically, when a read-side processor reads written data from a write-side processor, it is necessary to prevent passing by the read-side processor, thereby avoiding reading data with a size larger than that of the written data.

In view of the foregoing, it is an object of the present invention to efficiently perform data transfer between processors in a multiprocessor including a shared cache memory. Moreover, it is an object of the present invention to achieve synchronization by the shared cache memory, when data transfer between processors is performed in the multiprocessor.

The present invention is made to solve the above-described issues, and a cache memory according to a first aspect of the invention includes: a tag storage section including a plurality of entries each including a tag address and a remaining number of times for reference, one or more entries being retrieved for reference through searching the plurality of entries by a first address-segment which configures part of an access address; a data storage section holding pieces of data each corresponding to the plurality of entries; a tag control section comparing a second address-segment which configures another part of the access address with the tag address included in each of the one or more of the retrieved entries, thereby to find an entry having a tag address that matches the second address-segment; and a data control section selecting a piece of data corresponding to the found entry from the data storage section, in a read access, in which, in the read access, the tag control section invalidates the found entry without performing a write-back operation after the read access when the remaining number of times for reference included in the found entry is equal to one, whereas the tag control section decrements, by one, the remaining number of times for reference included in the found entry when the remaining number of times for reference is greater than one. Therefore, the cache memory exerts an action of invalidating data after the data is read a number of times equal to the remaining number of times for reference.

Moreover, in the first aspect, upon an execution of write access, the tag control section may perform control to save data to be written in the write access and the number of times for reference into an external memory without accessing the tag storage section and the data storage section, when the remaining number of times for reference in each of the retrieved entries is greater than zero. Therefore, the cache memory exerts an action of saving data with a size exceeding a capacity of the cache memory in the external memory to continue subsequent transfer. Further, in this case, the cache memory may further include a pre-fetch control section performing control to prefetch the saved data and the saved number of times for reference from the external memory to the data storage section and the tag storage section, respectively, when the data storage section has a free space. Therefore, the pre-fetch control section exerts an action of prompting data transfer from a memory to the cache memory.

Moreover, in the first aspect, the cache memory may further include a region designation register designating a specific region on a memory, and upon an execution of write access, the tag control section may perform control to save data to be written in the write access into an external memory without accessing the tag storage section and the data storage section, when the access address belongs to the specific region and when the remaining number of times for reference in each of the retrieved entries is greater than zero. Therefore, the cache memory exerts an action of saving data with a size exceeding the capacity of the cache memory in a memory region designated by the region designation register to continue subsequent transfer. Further, in this case, the cache memory may further include a pre-fetch control section performing control to prefetch the saved data from the external memory to the data storage section as well as to set the remaining number of times for reference in the tag storage section to one, when the data storage section has a free space. The pre-fetch control section exerts an action of prompting data transfer from the memory to the cache memory.

Moreover, a cache memory control unit according to a second aspect of the invention includes: a tag storage section including a plurality of entries each including a tag address and a remaining number of times for reference, one or more entries being retrieved for reference through searching the plurality of entries by a first address-segment which configures part of an access address; and a tag control section comparing a second address-segment which configures another part of the access address with the tag address included in each of the one or more of the retrieved entries, thereby to find an entry having a tag address that matches the second address-segment, in which, in a read access, the tag control section invalidates the found entry without performing a write-back operation after the read access when the remaining number of times for reference included in the found entry is equal to one, whereas the tag control section decrements, by one, the remaining number of times for reference included in the found entry when the remaining number of times for reference is greater than one. Therefore, the cache memory control unit exerts an action of invalidating data after the data is read a number of times equal to the remaining number of times for reference.

Further, a cache memory according to a third aspect of the invention includes: a tag storage section including a plurality of entries each including a tag address and a time-limitation flag indicating whether or not the entry is time-limited, one or more entries being retrieved for reference through searching the plurality of entries by a first address-segment which configures part of an access address; a data storage section holding pieces of data each corresponding to the plurality of entries, and holding a remaining number of times for reference of an entry including a time-limitation flag indicating that the entry is time-limited; a tag control section comparing a second address-segment which configures another part of the access address with the tag address included in each of the one or more of the retrieved entries, thereby to find an entry having a tag address that matches the second address-segment; and a data control section selecting a piece of data corresponding to the found entry from the data storage section, in a read access, in which, in the read access, the tag control section invalidates the found entry without performing a write-back operation after the read access, when the found entry includes a time-limitation flag indicating that the entry is time-limited and when the remaining number of times for reference included in the found entry is equal to one, and the data control section decrements, by one, the remaining number of times for reference included in the found entry, when the found entry includes the time-limitation flag indicating that the entry is time-limited and when the remaining number of times for reference included in the found entry is greater than one. Therefore, the cache memory exerts an action of invalidating data after the data is read a number of times equal to the remaining number of times for reference.

Moreover, in the third aspect, upon an execution of write access, the tag control section may perform control to save data to be written in the write access and the number of times for reference into an external memory without accessing the tag storage section and the data storage section when the remaining number of times for reference in each of the retrieved entries is greater than zero. Therefore, the cache memory exerts an action of saving data with a size exceeding a capacity of the cache memory in the external memory to continue subsequent transfer. Further, in this case, the cache memory may further include a pre-fetch control section performing control to prefetch the saved data and the saved number of times for reference from the external memory to the data storage section, when the data storage section has a free space. The pre-fetch control section exerts an action of prompting data transfer from the memory to the cache memory.

Further, in the third aspect, the cache memory may further include a region designation register designating a specific region on a memory, and upon an execution of write access, the tag control section may perform control to save data to be written in the write access into an external memory without accessing the tag storage section and the data storage section, when the access address belongs to the specific region and when the remaining number of time for reference in each of the retrieved entries is greater than zero. Therefore, the cache memory exerts an action of saving data with a size exceeding a capacity of the cache memory in the external memory to continue subsequent transfer. Further in this case, the memory cache may further include a pre-fetch control section performing control to prefetch the saved data from the external memory to the data storage section as well as to set the remaining number of times for reference in the data storage section to one, when the data storage section has a free space. Therefore, the pre-fetch control section exerts an action of prompting data transfer from the memory to the cache memory.

Moreover, a cache memory according to a fourth aspect of the invention includes: a tag storage section including a plurality of entries each including a tag address and a data amount field, one or more entries being retrieved for reference through searching the plurality of entries by a first address-segment which configures part of an access address; a data storage section holding pieces of data each corresponding to the plurality of entries; a tag control section comparing a second address-segment which configures another part of the access address with the tag address included in each of the one or more of the retrieved entries, thereby to find an entry having a tag address that matches the second address-segment; and a data control section writing data-to-be-written to the found entry in the data storage section in a write access, and selecting data corresponding to the found entry from the data storage section in a read access, in which, in a write access, the tag control section stays on standby until a free space is reserved based on a value of the data amount field included in the found entry, and then adds an amount of data written in the write access to the data amount field after the write access, and in a read access, the tag control section stays on standby until an amount of data to be read in the read access is reserved based on the value of the data amount field included in the found entry, and then subtracts an amount of data read in the read access from the data amount field after the read access. Therefore, the cache memory exerts an action of adjusting a wait for space in the write access and a wait for data in the read access based on the value of a data amount field.

Moreover, in the fourth aspect, the tag control section may have a first mode that allows the amount of data to be added to the data amount field at a delay timing after the write access, the delay timing being a timing when write accesses on a predetermined number of entries are completed. Therefore, the cache memory exerts an action of delaying an update of the data amount field and allowing a data rewrite. Further, irrespective of this, the tag control section may add, in the first mode, the amount of data to the data amount field, upon receiving a flush instruction.

Moreover, in the fourth aspect, each of the entries in the tag storage section may include a lock bit indicating whether or not the corresponding entry is locked, and the tag control section may lock the lock bit included in the found entry in the write access, whereas unlock the lock bit included in the found entry in the read access. Therefore, the cache memory exerts an action of preventing an entry in use from being evicted by another access. In this case, the tag control section may have a second mode that allows the lock bit to be locked at a delay timing after the write access, the delay timing being a timing when write accesses on a predetermined number of entries are completed. Therefore, the cache memory exerts an action of delaying an update of a lock bit and allowing a data rewrite. Further, irrespective of this, the tag control section may unlock, in the second mode, the lock bit, upon receiving a flush instruction.

Moreover, in the fourth aspect, upon an execution of write access, the tag control section may perform control to save data to be written in the write access and a write data amount into an external memory without accessing the tag storage section and the data storage section when the value of the data amount field in each of the retrieved entries is greater than zero or when the lock bits in the all entries are locked. Therefore, the cache memory exerts an action of saving data with a size exerting the capacity of the cache memory in the external memory to continue subsequent transfer.

Further, a cache memory control unit according to a fifth aspect of the invention includes: a tag storage section including a plurality of entries each including a tag address and a data amount field, one or more entries being retrieved for reference through searching the plurality of entries by a first address-segment which configures part of an access address; and a tag control section comparing a second address-segment which configures another part of the access address with the tag address included in each of the one or more of the retrieved entries, thereby to find an entry having a tag address that matches the second address-segment, in which, in a write access, the tag control section stays on standby until a free space is reserved based on a value of the data amount field included in the found entry, and then adds an amount of data written in the write access to the data amount field after the write access, and in a read access, the tag control section stays on standby until an amount of data to be read in the read access is reserved based on the value of the data amount field included in the found entry, and then subtracts an amount of data read in the read access from the data amount field. Therefore, the cache memory control unit exerts an action of adjusting a wait for space in the write access and a wait for data in the read access based on the value of the data amount field.

The invention is allowed to produce a superior effect of efficiently performing data transfer between processors in a multiprocessor including a shared cache memory. Moreover, the invention is allowed to produce an effect of allowing synchronization to be achieved by the shared cache memory, when data transfer between the processors is performed in the multiprocessor.

BRIEF DESCRIPTION OF THE DRAWINGS

FIG. 4 is a diagram illustrating an example of a correspondence relationship between a data storage section and a main memory according to the embodiment of the invention.

FIG. 33 is a diagram illustrating an example of data order change with use of a delay update mechanism according to the third embodiment of the invention.

FIG. 34 is a diagram illustrating an example of data size compression with use of the delay update mechanism according to the third embodiment of the invention.

FIG. 35 is a diagram illustrating an IDCT coefficient decoding algorithm in a typical codec.

FIG. 37 is a diagram illustrating an IDCT coefficient decoding algorithm in a codec optimized by a technique in related art.

FIG. 38 is a diagram illustrating an IDCT coefficient decoding algorithm in a codec using the delay update mechanism according to the third embodiment of the invention.

FIG. 41 is a diagram illustrating a configuration example of a deinterleaver in the application example of the embodiments of the invention.

DESCRIPTION OF EMBODIMENTS

Modes for carrying out the present invention (hereinafter referred to as "embodiments") will be described below. Description will be given in the following order.
1. First Embodiment (An example in which a reference number field is included in a tag storage section)
2. Second Embodiment (An example in which the reference number field is included in a data storage section)
3. Third Embodiment (An example in which a usable amount field and a lock field are included in the tag storage section)
4. Application Example (An application example to a digital television broadcast system)
5. Modification Examples

1. First Embodiment

Configuration of Information Processing System

Figure 1:
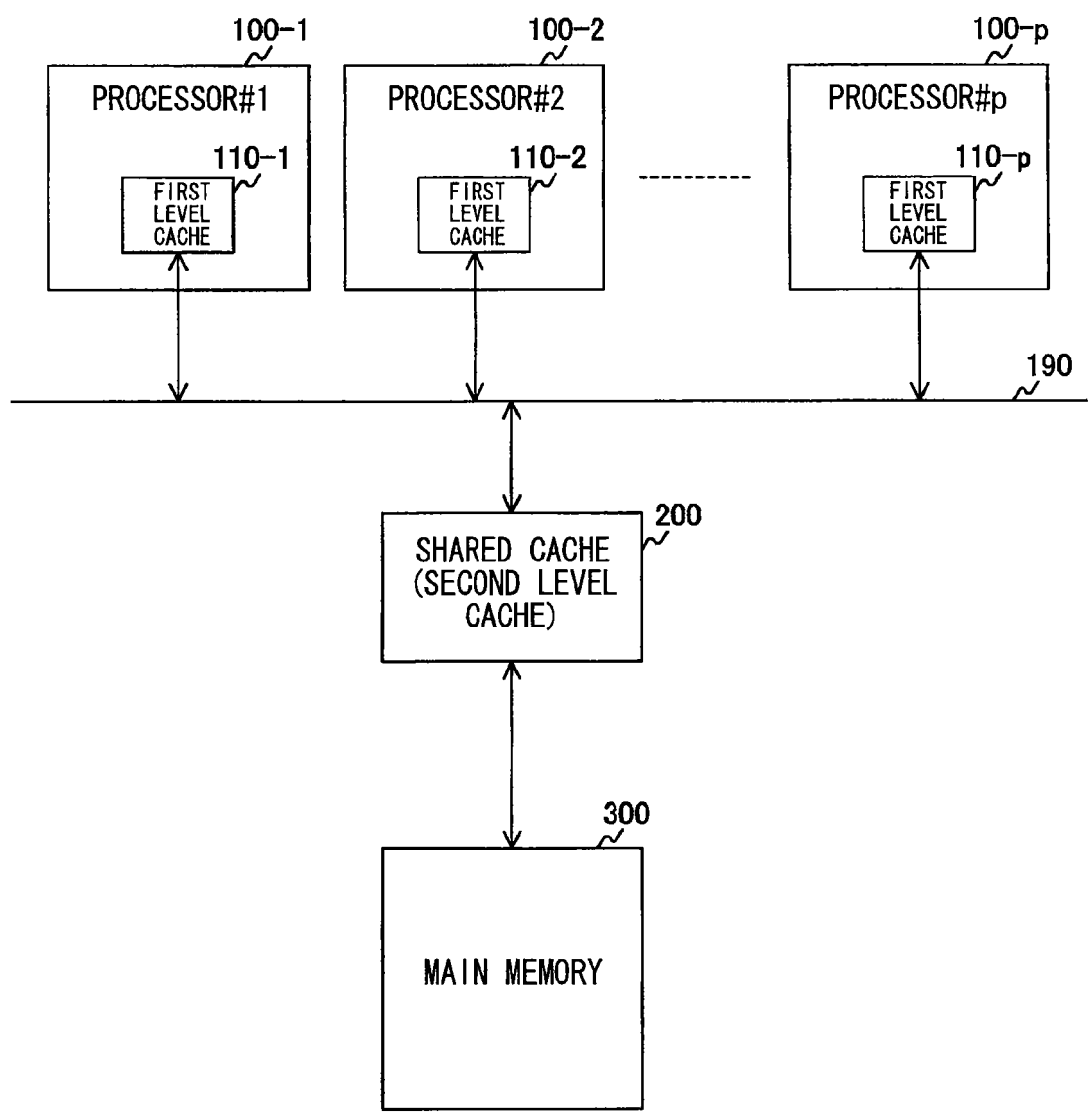
FIG. 1 is a diagram illustrating a configuration example of an information processing system according to an embodiment of the invention.

FIG. 1 is a diagram illustrating a configuration example of an information processing system according to an embodiment of the invention. The information processing system includes a number p (where p is an integer of 1 or more) of processors $100\text{-}1$ to $100\text{-}p$ (hereinafter may be collectively referred to as processors 100), a shared cache (second level cache) 200, and a main memory 300. The processors $100\text{-}1$ to $100\text{-}p$ and the shared cache 200 are connected to each other through a system bus 190.

The processors 100 internally include first level caches $110\text{-}1$ to $110\text{-}p$ (hereinafter may be collectively referred to as first level caches 110), respectively. The processor 100 performs a data access with use of the first level cache 110, as long as a hit occurs in the first level cache 110; however, when a miss hit occurs in the first level cache 110, the processor 100 performs an access to the shared cache 200. Moreover, when a miss hit occurs in the first level cache 110, the processor 100 performs a data access with use of the shared cache 200, as long as a hit occurs in the shared cache 200. On the other hand, when a miss hit occurs in the shared cache 200, the processor 100 performs an access to the main memory 300.

As described above, the embodiment of the invention adopts a three-level hierarchical storage configuration including the first level caches 110 corresponding to the respective processors 100, the shared cache (the second level cache) 200, and the main memory 300.

[Configuration of Shared Cache 200]

Figure 2:
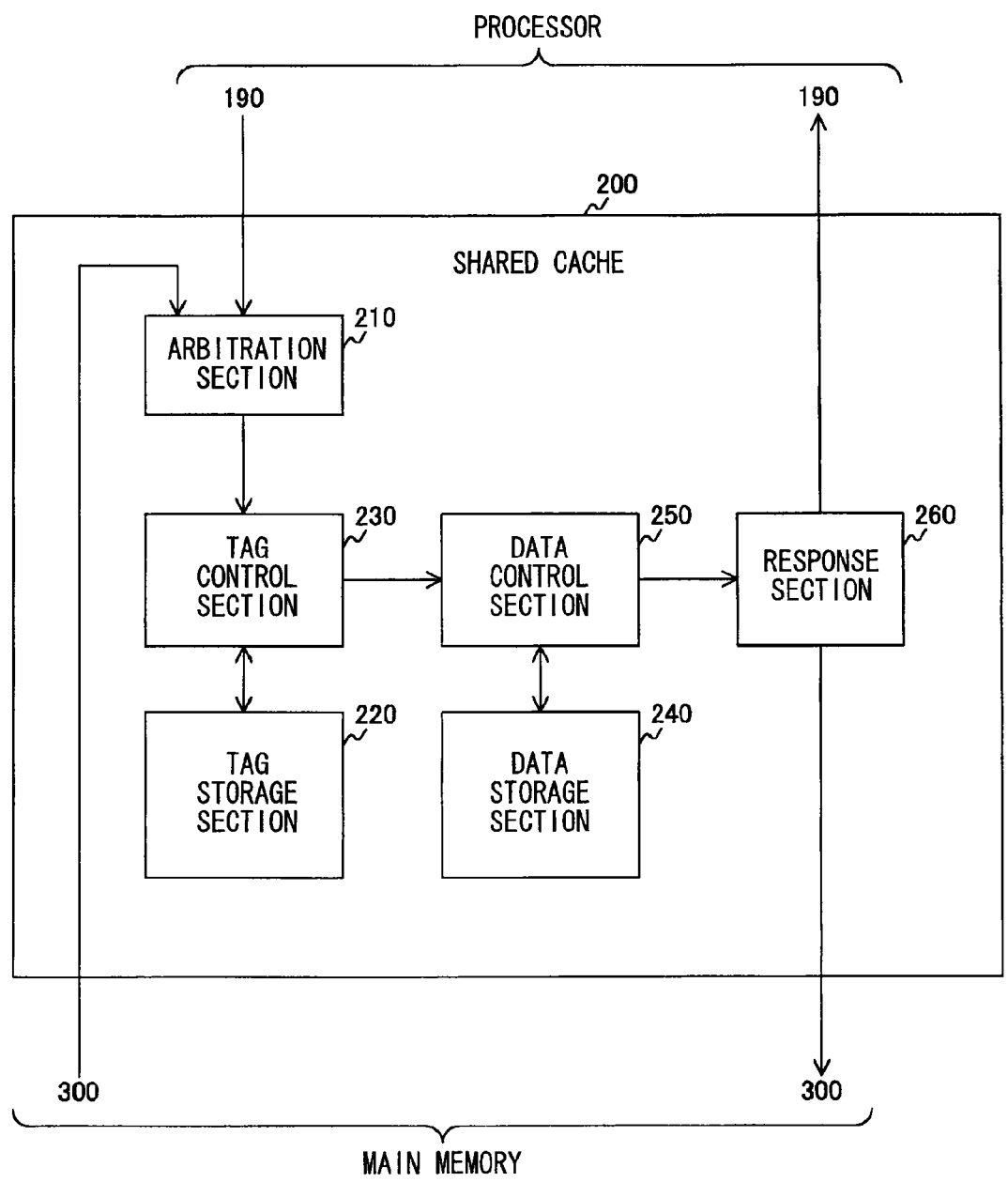
FIG. 2 is a diagram illustrating a functional configuration example of a shared cache according to the embodiment of the invention.

FIG. 2 is a diagram illustrating a functional configuration example of the shared cache 200 according to the embodiment of the invention. The shared cache 200 includes an arbitration section 210, a tag storage section 220, a tag control section 230, a data storage section 240, a data control section 250, and a response section 260.

The arbitration section 210 arbitrates accesses from the processors $100\text{-}1$ to $100\text{-}p$ and the main memory 300 to give access permission to one of them. For example, arbitration by the arbitration section 210 is considered to be accomplished by round-robin scheduling, in which the access permission is sequentially given to the processors $100\text{-}1$ to $100\text{-}p$ and the main memory 300. The permitted accesses are supplied to the tag control section 230.

The tag storage section 220 is a memory configured of a plurality of entries, and holds a tag address or the like in each of the entries. As will be described later, the tag address configures a part of an accessed address. The entries in the tag storage section 220 are retrieved for reference by another part of the accessed address.

The tag control section 230 performs control by selecting an entry to be accessed from the entries in the tag storage section 220, based on the accessed address. The data control section 250 is notified of the entry selected by the tag control section 230.

The data storage section 240 holds data corresponding to each entry in the tag storage section 220. The data stored in the data storage section 240 is controlled from one cache line to another, and transfer between the main memory 300 and the processor 100 is performed from one cache line to another as well.

The data control section 250 accesses data (a cache line) stored in the data storage section 240 based on the entry selected by the tag control section 230. In the case of a read access or a write-back operation, data read from the data storage section 240 is supplied to the response section 260. In the case of a write access, write data is embedded at a corresponding location in the data read from the data storage section 240, and resultant data is stored back in the data storage section 240.

The response section 260 outputs the data supplied from the data control section 250 to one of the processors $100\text{-}1$ to $100\text{-}p$ or the main memory 300. In the case of a response to a read access from the processor 100, the response section 260 outputs the data to the accessed processor 100. In the case of a write-back operation to the main memory 300, the response section 260 outputs the data to the main memory 300.

Figure 3:
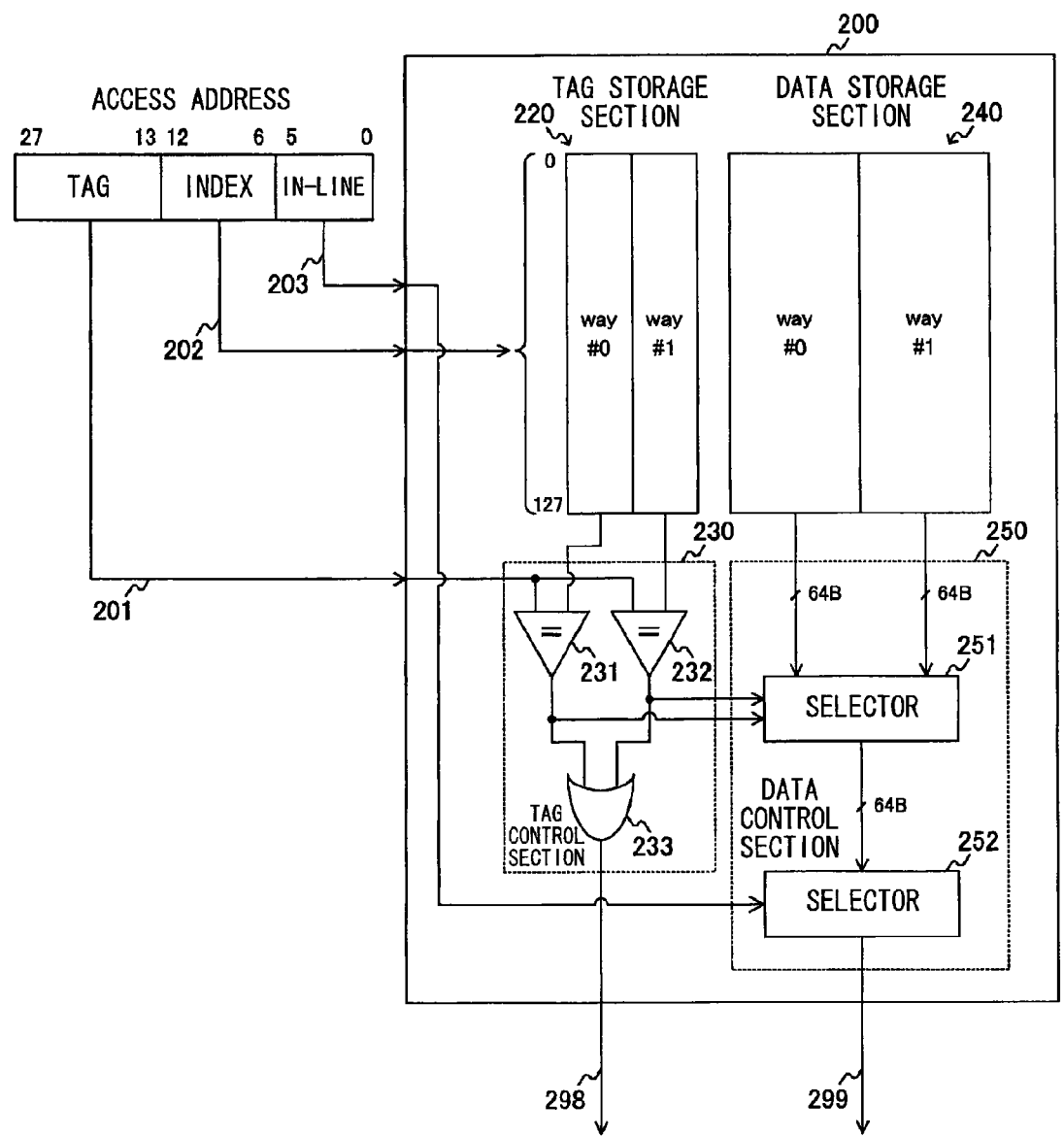
FIG. 3 is a diagram illustrating a circuit configuration example of the shared cache according to the embodiment of the invention.

FIG. 3 is a diagram illustrating a circuit configuration example of the shared cache 200 according to the embodiment of the invention. It is assumed here that the shared cache 200 is a 2-way set associative cache with 128 lines and a line size of 64 B (bytes). In other words, a maximum of two cache lines is allowed to be stored in one index address, and a data size corresponding to each cache line is 64 bytes.

In the case where a region of the main memory 300 has 256 MB, an address needs 28 bits. As a block size is 64 bytes, a total of 6 bits, i.e., 0th to 5th bits of an access address are allocated to an in-line address. Moreover, as the number of lines is 128, a total of 7 bits, i.e., 6th to 12th bits of the access address are allocated to an index address by which the entries in the tag storage section 220 are retrieved for reference. Consequently, a total of 15 bits, i.e., 13th to 27th bits of the access address are allocated to the tag address. The tag address, the index address, and the in-line address of the access address are supplied to the shared cache 200 through a signal line 201, a signal line 202, and a signal line 203, respectively.

The tag storage section 220 includes two ways #0 and #1 each including 128 entries. The ways of the tag storage section 220 are retrieved for reference by the index address supplied through the signal line 202. Therefore, in this example, two entries are retrieved for reference by the index address.

The tag control section 230 includes comparators 231 and 232 and an OR operator 233, and finds, from the retrieved entries in the tag storage section 220, an entry having a tag address that matches the tag address supplied through the signal line 201. The comparator 231 compares the tag address included in the retrieved entry in the way #0 of the tag storage section 220 with the tag address supplied through the signal line 201 to detect whether or not they match each other. Likewise, the comparator 232 compares the tag address included in the retrieved entry in the way #1 of the tag storage section 220 with the tag address supplied through the signal line 201 to detect whether or not they match each other. Comparison results by the comparators 231 and 232 are supplied to the OR operator 233 and the data control section 250. When a match between them is detected by the comparator 231 or 232, the OR operator 233 outputs a notification of occurrence of a hit through a signal line 298. However, as will be described later, in the case where a valid bit of the corresponding entry indicates invalidity, the occurrence of a miss hit is determined.

The data storage section 240 includes two ways #0 and #1 each configured of 128 cache lines, and holds data corresponding to each entry in the tag storage section 220. As in the case of the tag storage section 220, in the data storage section 240, cache lines are also retrieved for reference by the index address supplied through the signal line 202. Consequently, two sets of 64-byte line data are supplied to the data control section 250.

The data control section 250 includes selectors 251 and 252. The selector 251 selects one set from the two sets of 64-B data supplied from the data storage section 240. More specifically, when a match is detected by the comparator 231, line data from the way #0 of the data storage section 240 is selected, and when a match is detected by the comparator 232, line data from the way #1 of the data storage section 240 is selected. However, as will be described later, in the case where the valid bit of the entry where a match is detected indicates invalidity, data in a cache line corresponding to the entry is not selected. In the case where a match is detected in neither the comparator 231 nor the comparator 232, data in any cache line is not selected.

The selector 252 selects data at a location specified as the in-line address in the selected line data. The in-line address is supplied through the signal line 203. Alternatively, the processor 100 may have this function of the selector 252. In any of the cases, a whole or a part of the line data is supplied to the response section 260 through a signal line 299.

FIG. 4 is a diagram illustrating an example of a correspondence relationship between the data storage section 240 and the main memory 300 according to the embodiment of the invention. As in the example in FIG. 3, it is assumed here that the shared cache 200 is a 2-way set associative cache with 128 lines and a block size of 64 bytes.

As described above, each of the cache lines in the data storage section 240 is retrieved for reference by the index address. An index address of a 0th line is "0", an index address of a 1st line is "1", and so on, until the index address of a 127th line is "127".

The 0th line in the data storage section 240 holds a line of which lower-order 13 bits of the address is "0b0000000000000" (hereinafter, "0b" indicates that a number following "0b" is in binary). The 1st line in the data storage section 240 holds a line of which lower-order 13 bits of the address is "0b0000001000000". The 2nd line in the data storage section 240 holds a line of which lower-order 13 bits of the address is "0b0000010000000". A 3rd line in the data storage section 240 holds a line of which lower-order 13 bits of the address is "0b0000011000000". A 4th line in the data storage section 240 holds a line of which lower-order 13 bits of the address is "0b0000100000000". Likewise, the 127th line in the data storage section 240 holds a line of which lower-order 13 bits of the address is "0b1111111000000".

In other words, in this example, only two cache lines for a certain index address are allowed to be stored in the shared cache 200. Accordingly, to store new data in a set having been already occupied by two cache lines, it is necessary to evict one of the cache lines for replacement. One known method of selecting a cache line to be replaced is a method of evicting a least-recently-used cache line (LRU policy).

[Configuration and Functions of Tag Storage Section 220]

Figure 5:
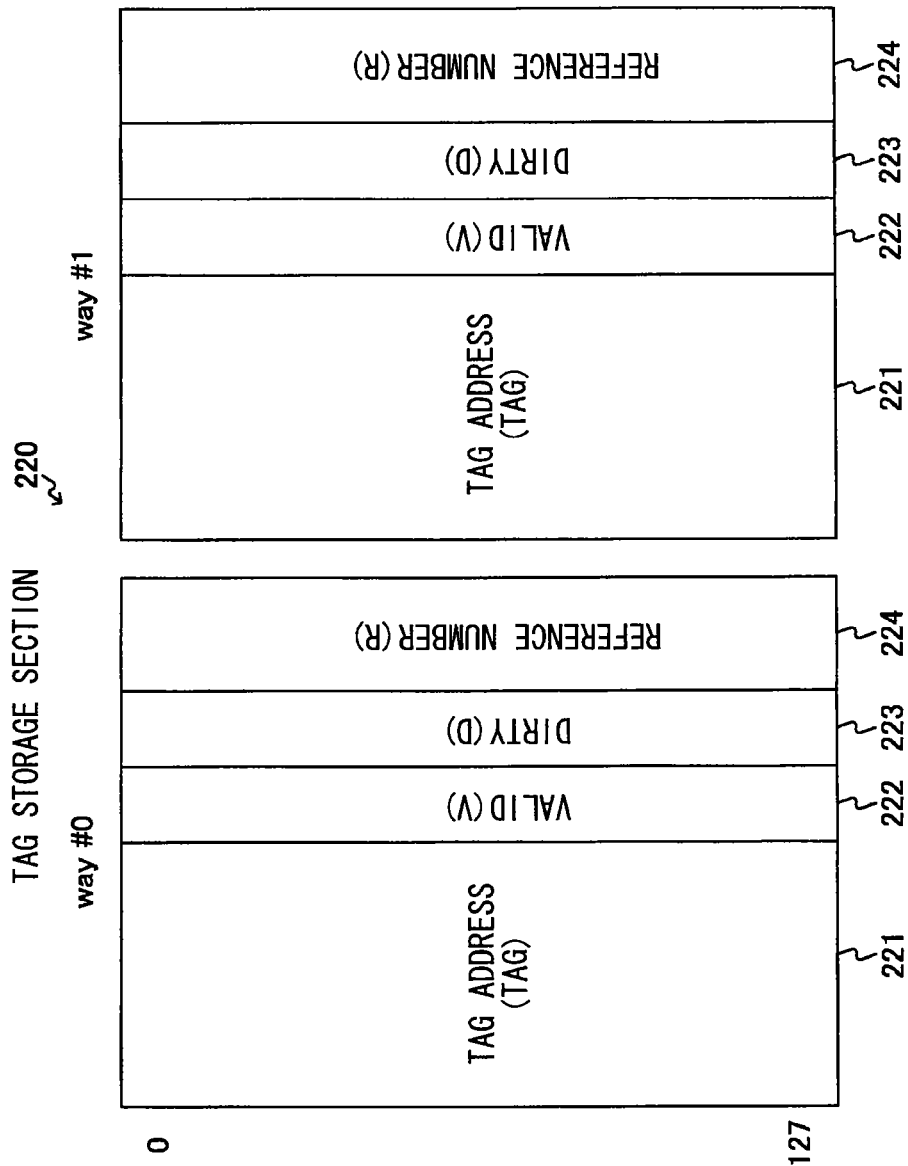
FIG. 5 is a diagram illustrating a field configuration example of a tag storage section according to a first embodiment of the invention.

FIG. 5 is a diagram illustrating a field configuration example of the tag storage section 220 according to a first embodiment of the present invention. Each entry in the tag storage section 220 includes fields, i.e., a tag address field 221, a valid field 222, a dirty field 223, and a reference number field 224.

The tag address field 221 holds a tag address (i.e., higher-order 15 bits of an address) of a cache line corresponding to the entry. In the drawing, the tag address field 221 is labeled as "TAG" for short.

The valid field 222 holds a valid bit (valid) which indicates validity of the entry. When a value of the valid field 222 is "1", data in the cache line corresponding to the entry is valid, and when the value of the valid field 222 is "0", the occurrence of a hit is not determined, even though a match is detected in the comparator 231 or 232. In the drawing, the valid field 222 is labeled as "V" for short.

The dirty field 223 holds a dirty bit (dirty) which indicates whether or not the data in the cache line corresponding to the entry and data in the main memory 300 are identical to each other. If a value of the dirty field 223 is "1," it means that the data in the cache line corresponding to the entry and the data in the main memory 300 are not identical to each other, and the data in the shared cache 200 is fresh. On the other hand, if the value of the dirty field 223 is "0", it means that the data in the cache line corresponding to the entry and the data in the main memory 300 are identical to each other. In the drawing, the dirty field 223 is labeled as "D" for short.

The reference number field 224 holds a remaining number of times for reference (reference number), which is a remaining number of times the cache line corresponding to the entry is supposed to be retrieved for reference. In the drawing, the reference number field 224 is labeled as "R" for short. The reference number field 224 is set concurrently with a write of data to be transferred to the cache line. When a read access is performed under a condition that a value of the reference number field 224 is "2" or greater, the value of the reference number field 224 is decremented by "1". Then, when a read access is performed under a condition that the value of the reference number field 224 is "1", the cache line is invalidated after the read access. At this time, a write-back to the main memory 300 is not performed.

It is to be noted that, when the value of the reference number field 224 is "0", even if the read access is performed, the value does not change. Therefore, an operation according to a normal cache algorithm is allowed to be performed. In other words, as long as a cache hit occurs, invalidation is not performed irrespective of how many times a read access is performed, and when invalidation is necessary, a write-back to the main memory 300 is performed.

Figure 6:
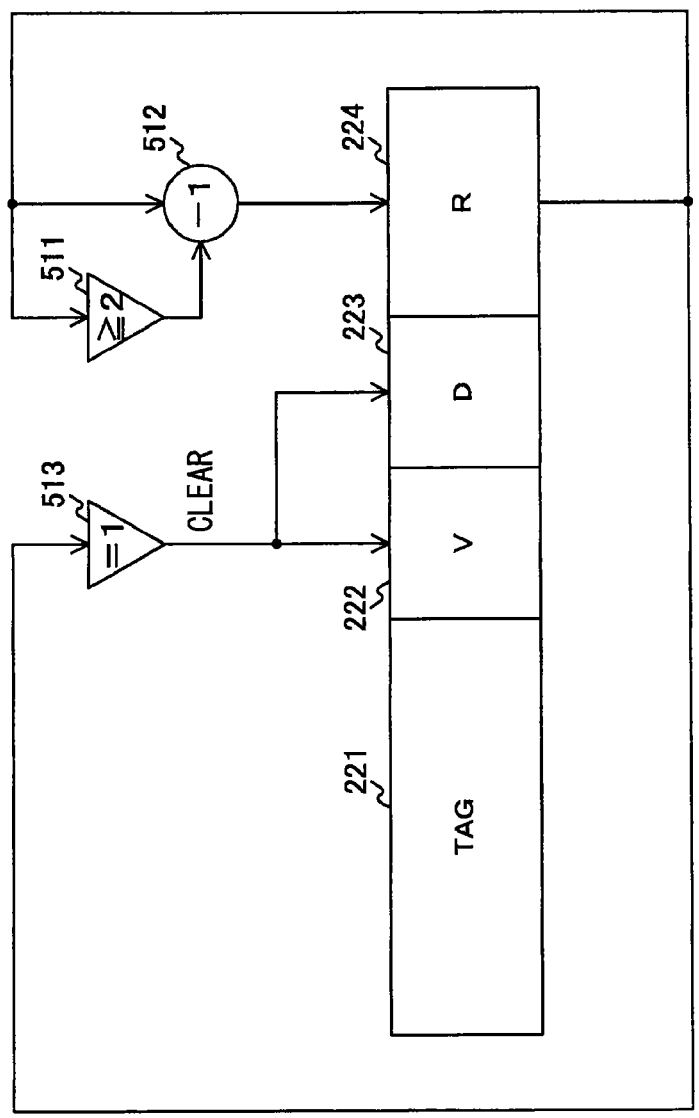
FIG. 6 is a diagram illustrating a configuration example in relation to an update of the tag storage section according to the first embodiment of the invention.

FIG. 6 is a diagram illustrating a configuration example in relation to an update of the tag storage section 220 according to the first embodiment of the invention. It is assumed here that tag storage section 220 or the tag control section 230 includes a comparator 511, a subtracter 512, and a comparator 513.

In a read access, when the reference number field 224 of a target cache line is read, and the comparator 511 detects that the value of the reference number field 224 is "2" or greater, the subtracter 512 decrements the value of the reference number field 224 by "1". Moreover, in a read access, when the reference number field 224 of the target cache line is read, and the comparator 513 detects that the value of the reference number field 224 is "1", the cache line is invalidated. In other words, the values of the valid field 222 and the dirty field 223 are zeroed.

Therefore, data transfer is allowed to be performed between the processors 100 with use of the shared cache 200 as a shared FIFO. At this time, data having been transferred is not written back and is invalidated, thereby not remaining in the shared cache 200.

[Transfer of Data with Size Exceeding Cache Capacity]

To transfer data with a size exceeding the capacity of the shared cache 200 between the processors 100, it is useful to add an uncache path not using the shared cache 200, and add the following control function to the data control section 250.

For example, it is assumed that the processor 100-1 writes data with a number of times for reference to the shared cache 200. In a stage where the amount of written data exceeds a certain amount (for example, the capacity of the shared cache 200), detection of a tag match for the write access in the tag control section 230 causes an event that the reference number field 224 has been already set in all of the ways. In this case, data is not written to the shared cache 200, and is directly stored in the main memory 300 through an uncache path. At this time, the number of times for reference accompanying write data is also saved in the main memory 300.

After that, for example, the processor 100-2 reads data from the shared cache 200, and a cache line of which the value of the reference number field 224 is changed from "1" to "0" is invalidated. Then, when a subsequent read access request is issued by the processor 100-2, data is filled into the shared cache 200 from the main memory 300. At this time, the saved number of times for reference is written to the reference number field 224. Consequently, a read access from the processor 100-2 is allowed.

Figure 7:
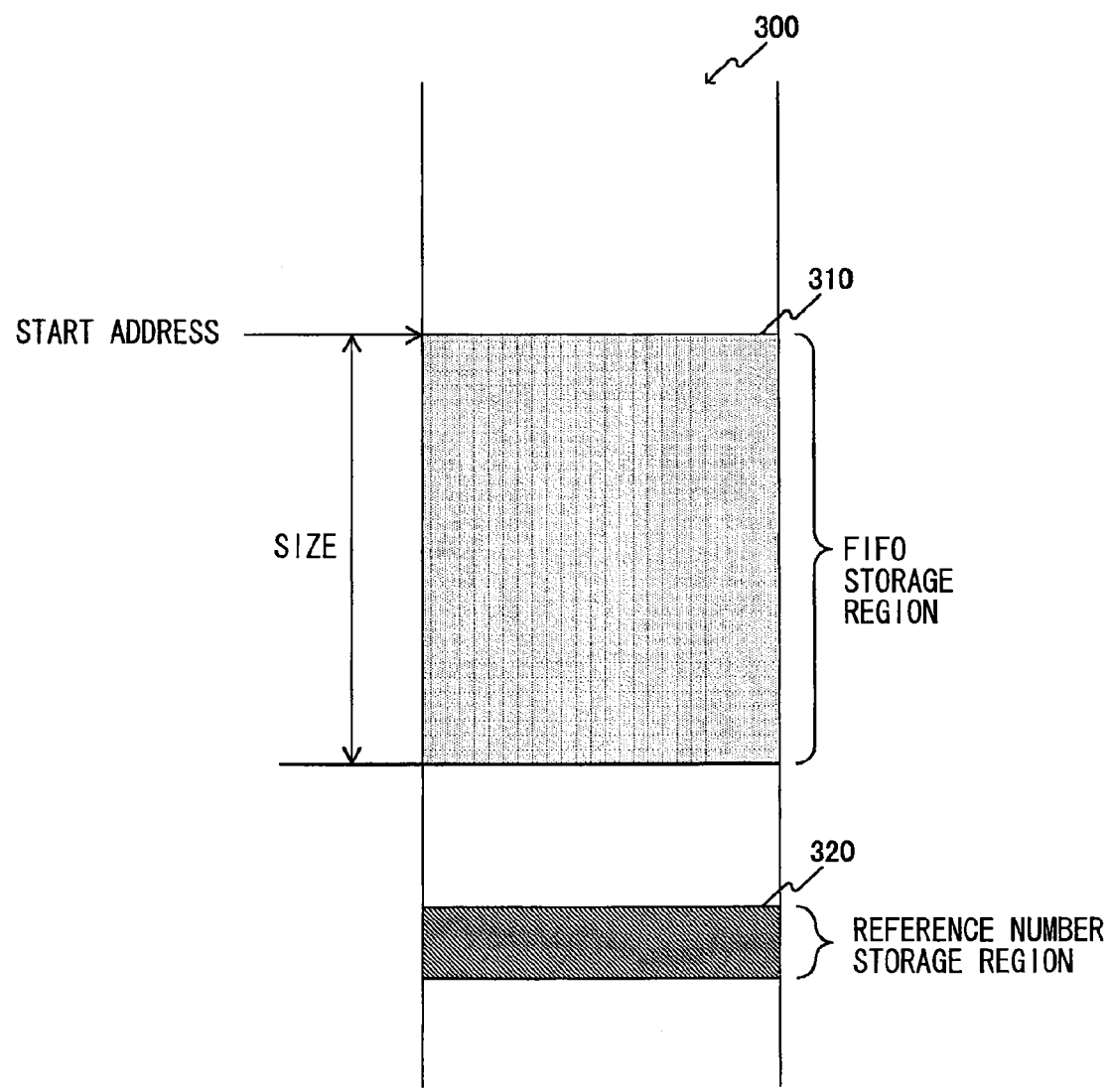
FIG. 7 is a diagram illustrating a first example of a relationship between a main memory and a FIFO storage region according to the first embodiment of the invention.

FIG. 7 is a diagram illustrating a first example of a relationship between the main memory 300 and a FIFO storage region 310 according to the first embodiment of the invention. A continuous space of the main memory 300 is used as the FIFO storage region 310 shared among the processors 100. Therefore, the FIFO storage region 310 is designated by a start address and a size. In this example, the FIFO storage region 310 is determined in advance by a predetermined value. In the case where the reference number field 224 has been already set in all of the ways as described above, write data is not written to the shared cache 200, and is saved in the FIFO storage region 310.

Moreover, in addition to the FIFO storage region 310, a reference number storage region 320 saving the number of times for reference therein is allocated to the main memory 300. In the case where the reference number field 224 has been already set in all of the ways as described above, the number of times for reference accompanying the write data is not written to the shared cache 200, and is saved in the reference number storage region 320.

[Operation of Shared Cache 200]

Figure 8:
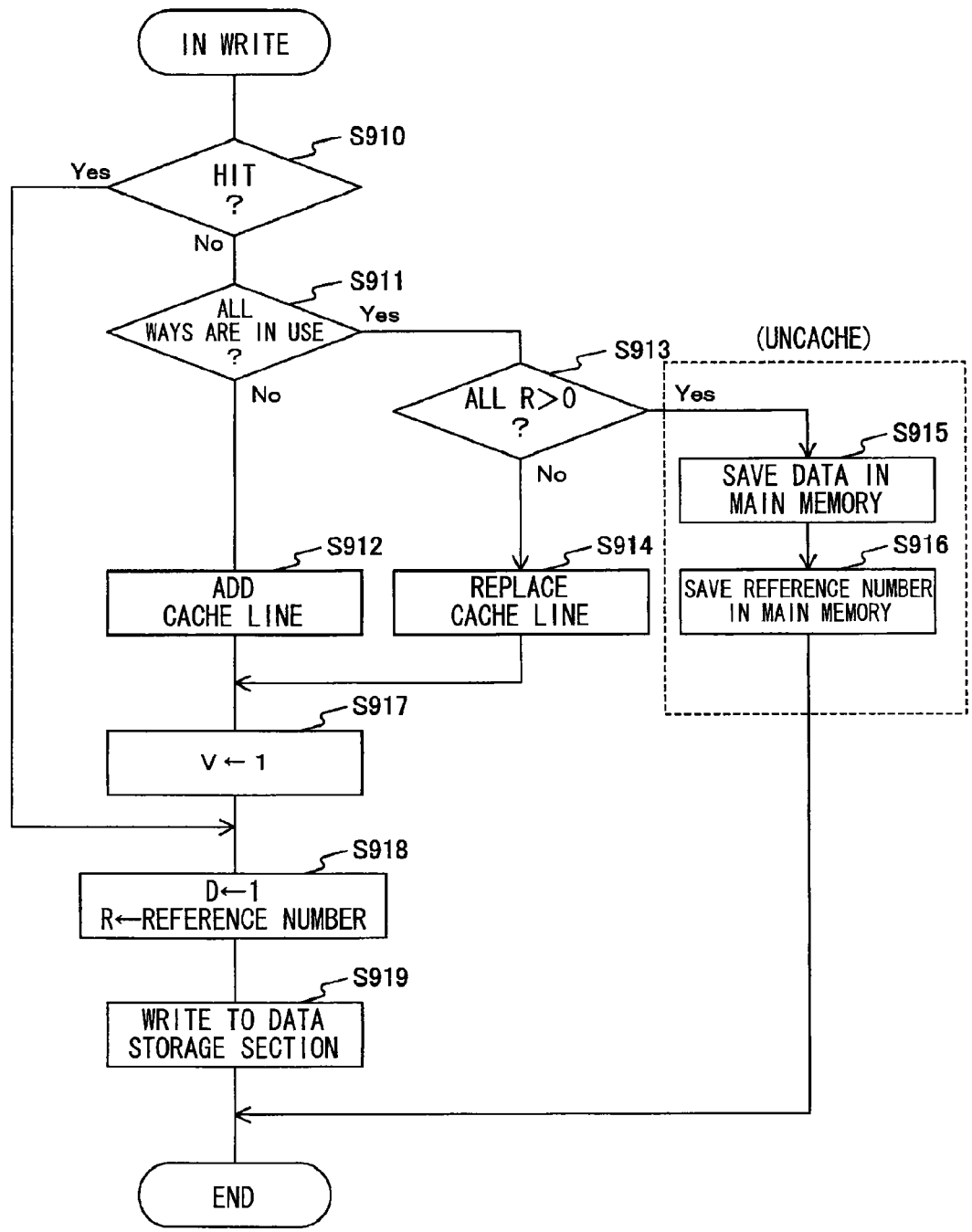
FIG. 8 is a diagram illustrating a procedure in a write to the shared cache according to the first embodiment of the invention.

FIG. 8 is a diagram illustrating a procedure in a write to the shared cache 200 according to the first embodiment of the invention.

When a cache hit is detected from a comparison result in the tag control section 230 (step S910), the dirty field 223 and the reference number field 224 of a cache line where the cache hit occurs are set to "1" and a number of times for reference accompanying write data, respectively (step S918). Then, write data is written to the data storage section 240 (step S919).

On the other hand, in the case where a miss hit is detected (step S910), when there is an unassigned way (step S911), a cache line is added (step S912), and the valid field 222 of the cache line is set to "1" (step S917). Then, the dirty field 223 and the reference number field 224 of the cache line are set to "1" and the number of times for reference accompanying the write data, respectively (step S918). Then, the write data is written to the data storage section 240 (step S919).

In the case where a miss hit is detected (step S910), when all of the ways are in use (step S911), and the reference number fields 224 in all of the ways are set to a value greater than zero (step S913), data is not written to the shared cache 200. In other words, data and the number of times for reference are saved in the main memory 300 through the uncache path (steps S915 and S916). Moreover, in the case where a miss hit is detected, when all of the ways are in use (step S911), and the reference number field 224 in one of the ways is set to zero (step S913), the cache line is replaced (step S914). An operation after replacement of the cache line is similar to that when a cache line is added (steps S917 to S919).

Figure 9:
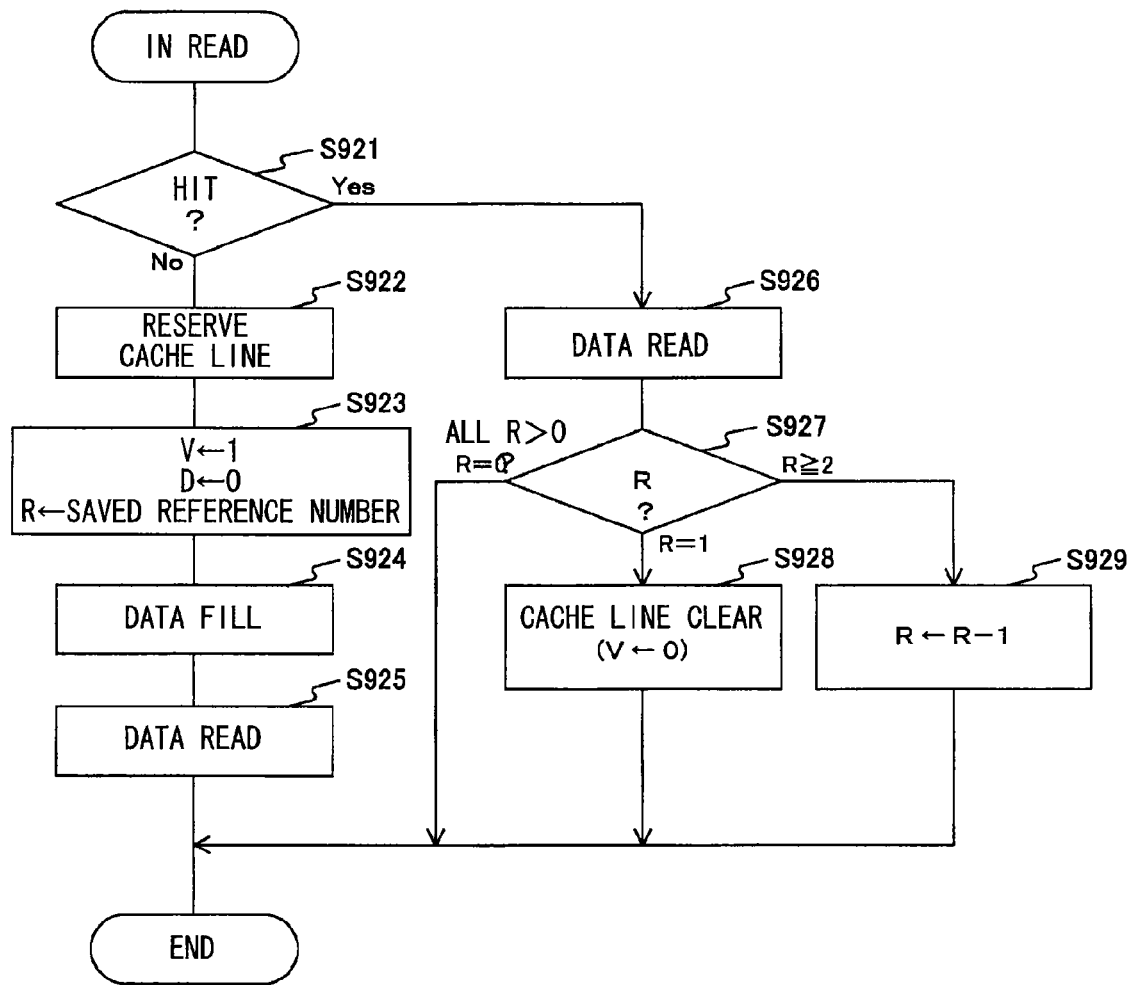
FIG. 9 is a diagram illustrating a procedure in a read from the shared cache according to the first embodiment of the invention.

FIG. 9 is a diagram illustrating a procedure in a read from the shared cache 200 according to the first embodiment of the invention.

When a miss hit is detected from a comparison result in the tag control section 230 (step S921), a cache line is reserved (step S922), and the valid field 222 of the cache line is set to "1" (step S923). At this time, the dirty field 223 is set to "0", and the reference number field 224 is set to the number of times for reference saved in the reference number storage region 320 of the main memory 300 (step S923). Then, data is filled into the data storage section 240 from the FIFO storage region 310 of the main memory 300 (step S924). After that, data is read from the data storage section 240 of the cache line (step S925).

When a cache hit is detected from a comparison result in the tag control section 230 (step S921), data is read from a cache line where the cache hit occurs of the data storage section 240 (step S926). At this time, when the value of the reference number field 224 of the cache line is "1" (step S927), the valid field 222 is set to"0" to invalidate the cache line (step S928). When the value of the reference number field 224 is "2" or greater (step S927), the value of the reference number field 224 is decremented by "1" (step S929). It is to be noted that, when the value of the reference number field 224 is"0" (step S927), the value of the reference number field 224 does not change.

Figure 10:
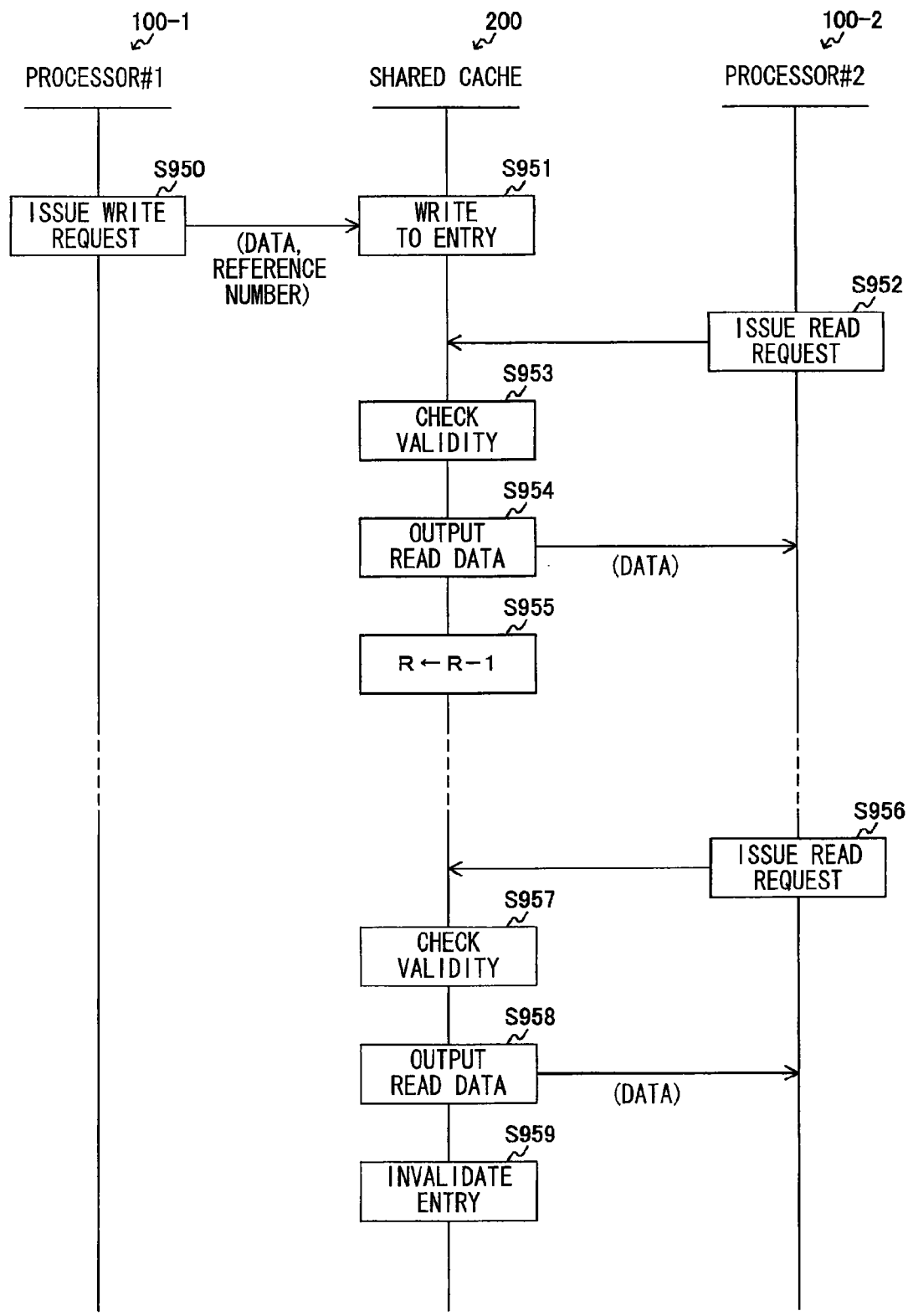
FIG. 10 is a diagram illustrating a first example of a data transfer sequence between processors according to the first embodiment of the invention.

FIG. 10 is a diagram illustrating a first example of a data transfer sequence between processors according to the first embodiment of the invention. In this example, the shared cache 200 has a sufficient capacity.

When the processor 100-1 issues a write request including write data and the number of times for reference (step S950), the shared cache 200 reserves a cache line, and write data and the number of times for reference are written to an entry corresponding to the cache line (step S951).

After that, when the processor 100-2 issues a read request (step S952), the shared cache 200 performs comparison in the tag control section 230 (step S953), and when a cache hit occurs, the shared cache 200 outputs data to the processor 100-2 (step S954). At this time, assuming that the reference number field 224 has a value of "2" or greater, the value of the reference number field 224 is decremented by "1" (step S955).

When the processor 100-2 issues a read request several times (step S956), a cache hit occurs (step S957) and data is output to the processor 100-2 (step S958). At this time, assuming that the value of the reference number field 224 is "1", the cache line is invalidated without performing a write-back operation (step S959).

Figure 11:
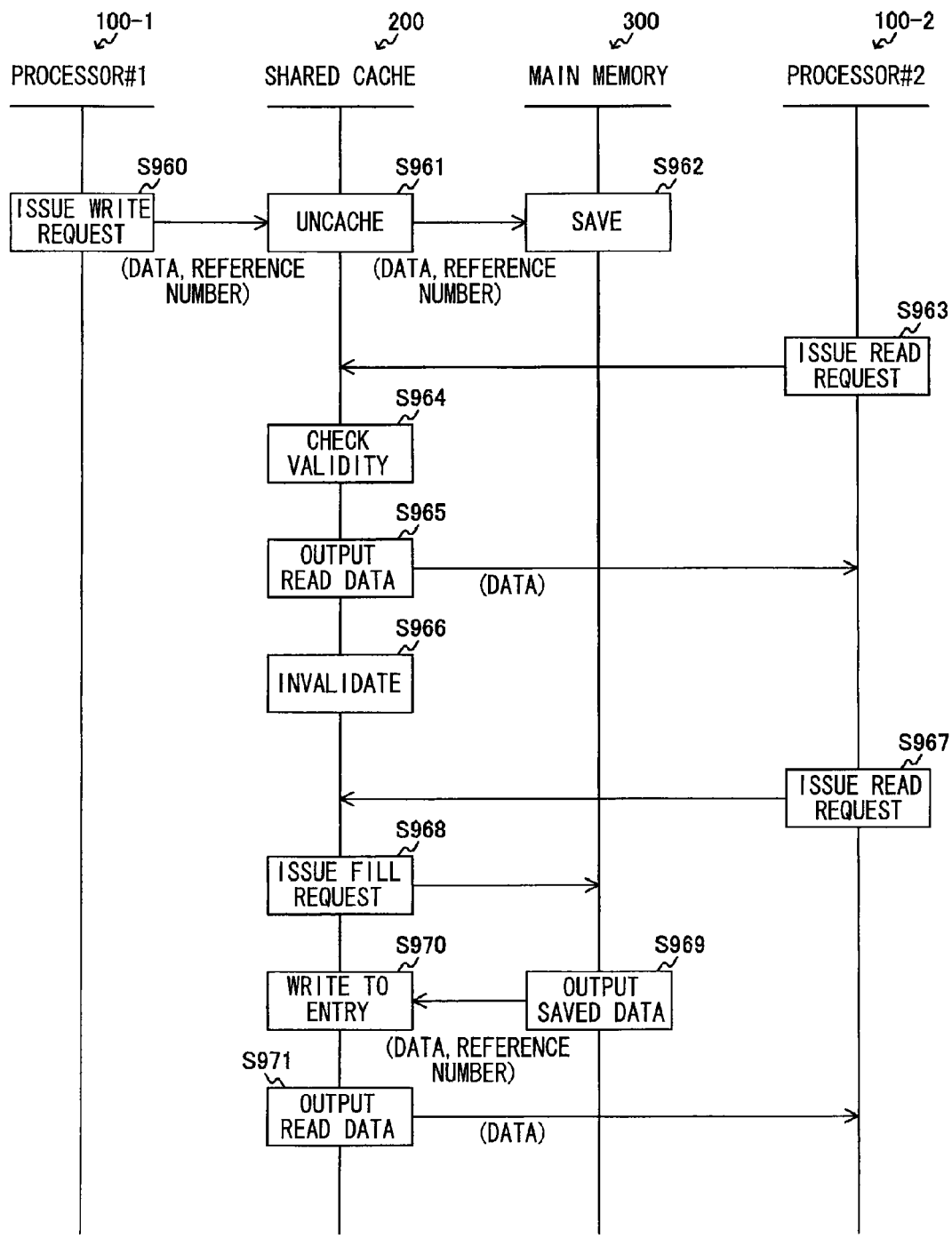
FIG. 11 is a diagram illustrating a second example of the data transfer sequence between the processors according to the first embodiment of the invention.

FIG. 11 is a diagram illustrating a second example of the data transfer sequence between processors according to the first embodiment of the invention. In this example, data with a size exceeding the capacity of the shared cache 200 is transferred.

When the processor 100-1 issues a write request (step S960), it is assumed that the shared cache 200 is not allowed to reserve a cache line, and data is not written to the shared cache 200 (step S961), and the data and the number of times for reference are saved in the main memory 300 (step S962).

After that, the processor 100-2 issues a read request for other data (step S963), and a cache hit occurs (step S964), and data is output to the processor 100-2 (step S965). At this time, assuming that the value of the reference number field 224 is "1", the cache line is invalidated without performing a write-back operation (step S966).

Next, when the processor 100-2 issues a read request for the saved data (step S967), a miss hit occurs, and the shared cache 200 issues a fill request to the main memory 300 (step S968). When the data and the number of times for reference which are saved in the main memory 300 are output to the shared cache 200 (step S969), the shared cache 200 writes the data and the number of times for reference to an entry of a cache line (step S970). Thus, the saved data is allowed to be read from the shared cache 200, and data is output to the processor 100-2 (step S971).

With use of such a mechanism, whenever a cache miss is caused by an access from a read-side processor, data is allowed to be filled into the shared cache 200. However, there is a possibility that, when a data fill is activated in response to a read access, a high-speed operation is not allowed to be performed. Therefore, a configuration example to achieve a prefetch from the main memory 300 to the shared cache 200 will be described below.

[Prefetch to Shared Cache 200]

Figure 12:
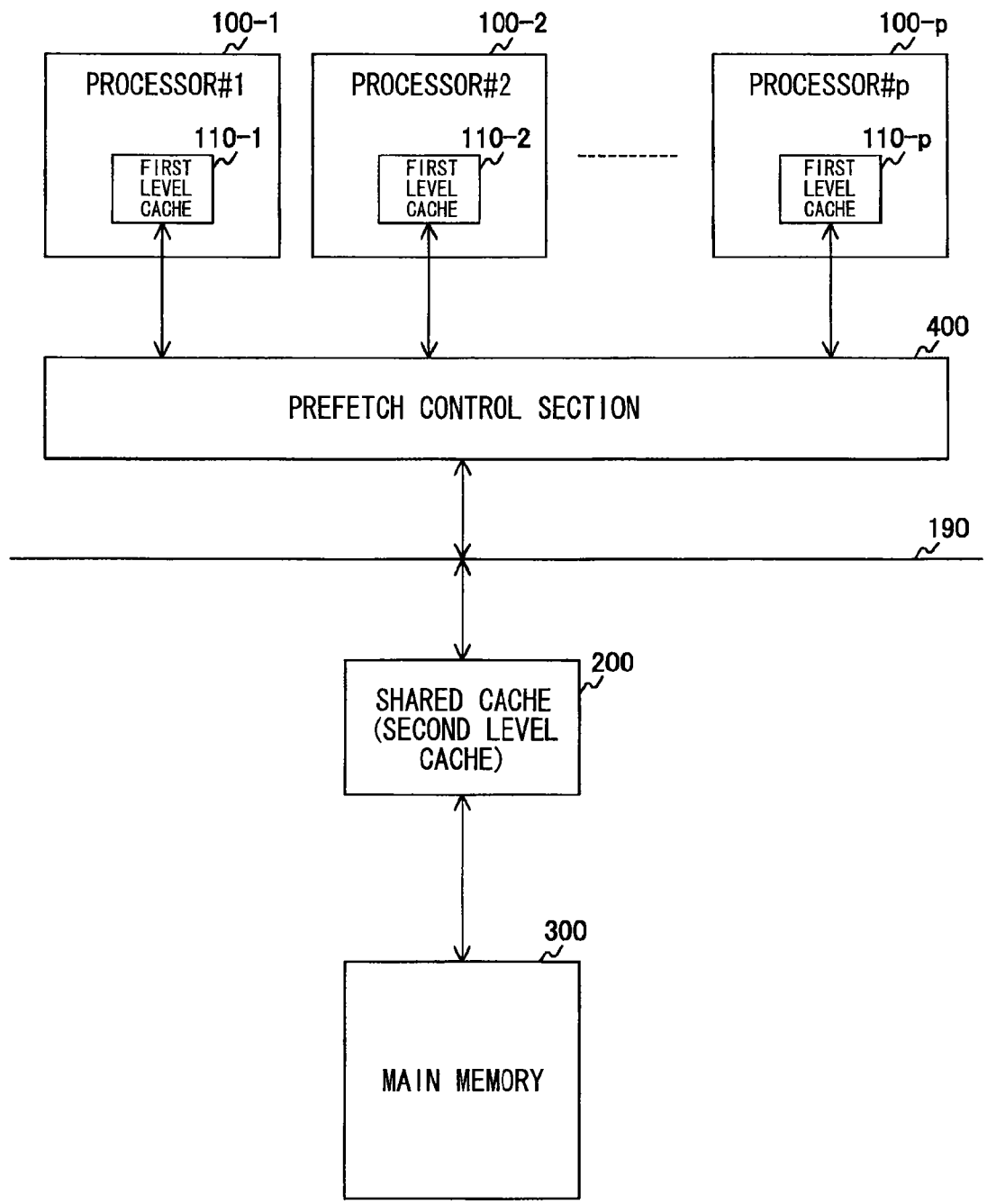
FIG. 12 is a diagram illustrating a configuration example of the information processing system provided with a prefetch function according to the first embodiment of the invention.

FIG. 12 is a diagram illustrating a configuration example in which the information processing system according to the first embodiment of the invention has a prefetch function. In this configuration example, a pre-fetch control section 400 is connected between the processors 100-1 to 100-p and the shared cache 200. The pre-fetch control section 400 issues a read request to the shared cache 200 ahead of a read access from the processor 100 to allow a prefetch to be performed. In other words, the prefetch prompts data transfer from the main memory 300 to the shared cache 200.

Figure 13:
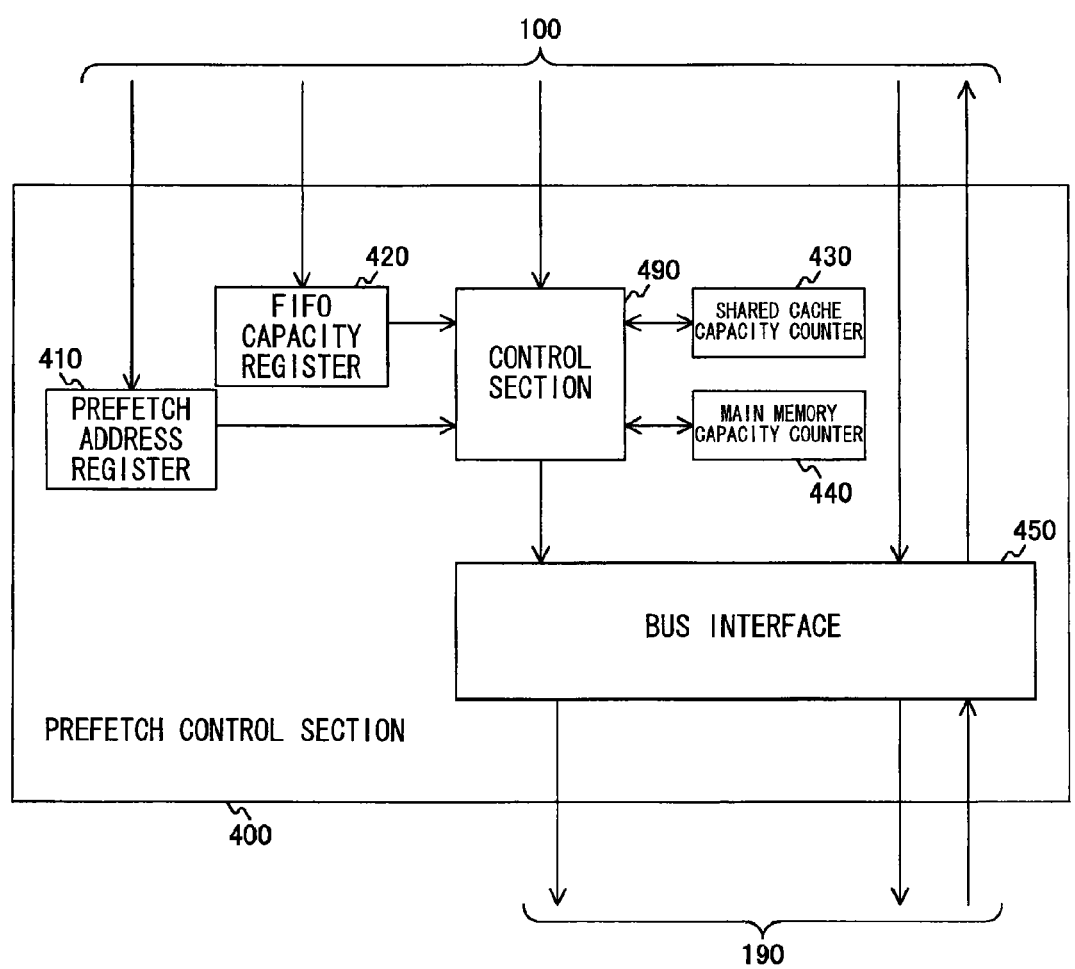
FIG. 13 is a diagram illustrating a configuration example of a pre-fetch control section according to the first embodiment of the invention.

FIG. 13 is a diagram illustrating a configuration example of the pre-fetch control section 400 according to the first embodiment of the invention. The pre-fetch control section 400 includes a prefetch address register 410, a FIFO capacity register 420, a shared cache capacity counter 430, a main memory capacity counter 440, a bus interface 450, and a control section 490.

The prefetch address register 410 is a register holding a prefetch address for issuing a read request to the shared cache 200. The value of the prefetch address register 410 is controlled to be sequentially updated to be ready for a next prefetch.

The FIFO capacity register 420 is a register holding a total sum of the capacities of the shared cache 200 used as a shared FIFO and the main memory 300. The shared cache capacity counter 430 is a counter holding a data size stored in the shared cache 200. The main memory capacity counter 440 is a counter holding a size of data which is to be transferred and is stored in the main memory 300.

The bus interface 450 is a bus interface for a system bus 190 located closer to the shared cache 200. The control section 490 controls the entire pre-fetch control section 400.

When data is transferred from the processor 100-1 to the processor 100-2 with use of the shared cache 200 used as a FIFO, first, a capacity treated as the FIFO is written to the FIFO capacity register 420. Next, a data write is performed to allow the processor 100-1 to transfer first data. At this time, a result obtained by adding an incremented value of the shared cache capacity counter 430 to a write address from the processor 100-1 is stored in the prefetch address register 410. The value of the prefetch address register 410 means an address for which a prefetch request may be issued.

After that, an increment in the shared cache capacity counter 430 by a write from the processor 100-1 is added to the prefetch address register 410. Then, when a prefetch occurrence condition which will be described later is satisfied, a prefetch request for the address stored in the prefetch address register 410 is issued. When a whole sequence of data transmission/reception by the shared cache 200 used as the FIFO is completed, the FIFO capacity register 420 is reset or cleared. The prefetch address register 410 is also cleared in response to this as a trigger.

Figure 14:
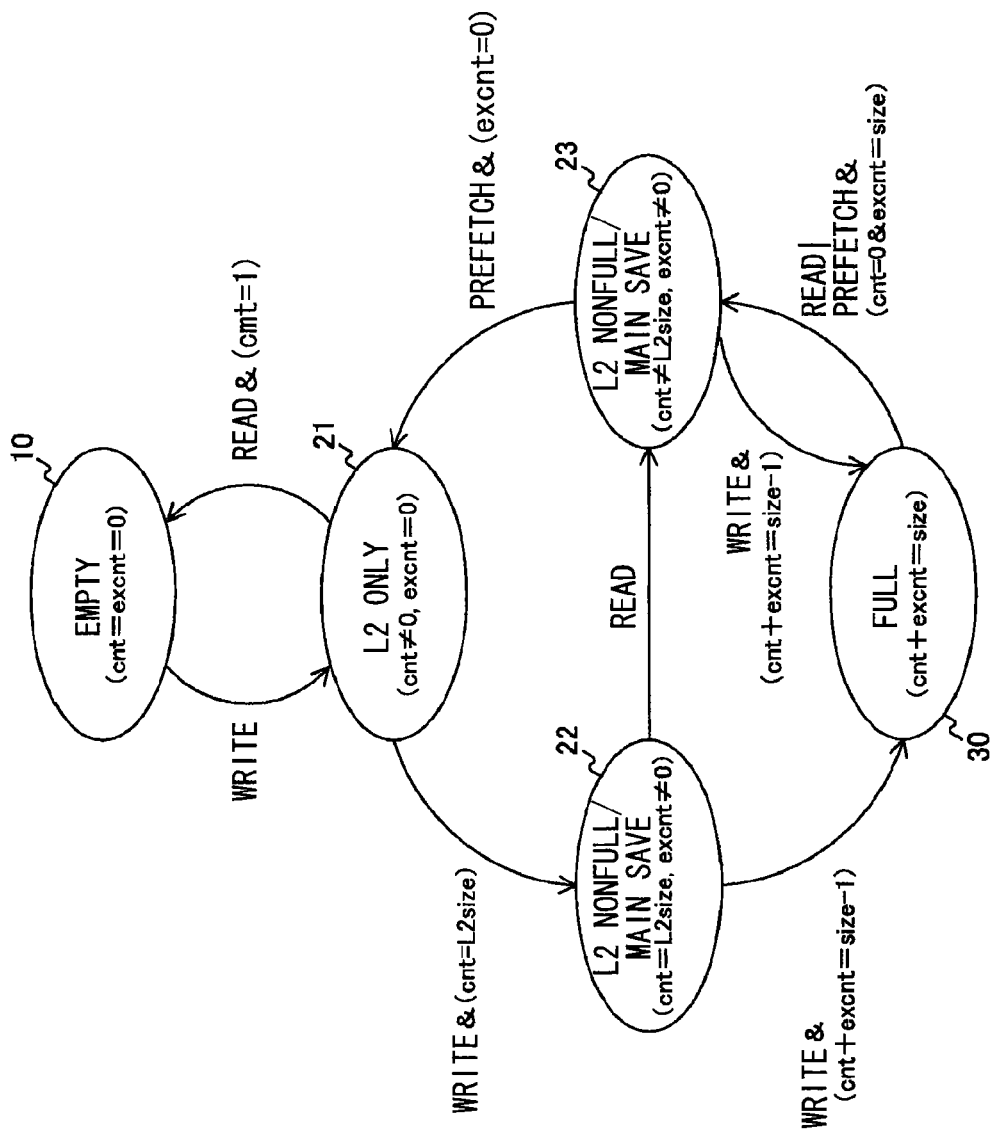
FIG. 14 is a diagram illustrating an example of state transition of the pre-fetch control section according to the first embodiment of the invention.

FIG. 14 is a diagram illustrating an example of a state transition of the pre-fetch control section 400 according to the first embodiment of the invention. The pre-fetch control section 400 is in one of an empty state 10, a L2 only state 21, an L2 full/main save state 22, an L2 nonfull/main save state 23, and a full state 30. It is to be noted that the value of the shared cache capacity counter 430 is labeled as cnt, the value of the main memory capacity counter 440 is labeled as excnt, the value of the FIFO capacity register 420 is labeled as size, and the total capacity of the shared cache 200 is labeled as L2size. Moreover, the number of times for reference of each data is 1.

The empty state 10 is a state where data to be transferred is not stored in any of the shared cache 200 and the main memory 300. In other words, cnt=0 and excnt=0 are established.

The L2 only state 21 is a state where data to be transferred is stored only in the shared cache 200. In other words, cnt≠0 and excnt=0 are established.

The L2 full/main save state 22 is a state where data to be transferred is stored in a whole of the shared cache 200 (the values of the reference number fields 224 in all of the ways are "1" or greater) as well as in the main memory 300. In other words, cnt=L2size and excnt≠0 are established.

The L2 nonfull/main save state 23 is a state where a cache line of which the value of the reference number field 224 is "0" is included in the shared cache 200, and data to be transferred is stored in the main memory 300. In other words, cnt≠L2size and excnt≠0 are established.

The full state 30 is a state where the capacity of data to be transferred reaches a capacity used as the shared FIFO. In other words, cnt+excnt=size is established.

The following transition is performed from one of such five states to another. It is to be noted that it is assumed here that data is transferred from the processor 100-1 to the processor 100-2.

First, when the processor 100-1 writes, to the shared cache 200, data to be transferred in the empty state 10, the value of the shared cache capacity counter 430 is incremented by "1" to cause transition to the L2 only state 21. Increment in the shared cache capacity counter 430 and state transition are performed at a timing of completing transaction between the pre-fetch control section 400 and the shared cache 200. Moreover, in the following description, updates of the shared cache capacity counter 430 and the main memory capacity counter 440 and state transition are performed also at a timing of completing transaction between the pre-fetch control section 400 and the shared cache 200.

In the L2 only state 21, when the processor 100-2 performs a read from the shared cache 200, the value of the shared cache capacity counter 430 is decremented by "1". At this time, when the value of the shared cache capacity counter 430 is decremented from "1" to "0", transition to the empty state 10 takes place. In the L2 only state 21, when the processor 100-1 performs a write to the shared cache 200, the value of the shared cache capacity counter 430 is incremented by "1". At this time, when the value of the shared cache capacity counter 430 reaches L2size, and only a write operation is performed, the value of the main memory capacity counter 440 is incremented from "0" to "1", and transition to the L2 full/main save state 22 takes place. At this time, data is not stored in the shared cache 200, and is directly stored in the main memory 300.

In the L2 full/main save state 22, when the processor 100-2 performs a read from the shared cache 200, the value of the shared cache capacity counter 430 is decremented by "1", and transition to the L2 nonfull/main save state 23 takes place. Read data at this time is data stored in the shared cache 200, and as described above, the number of times for reference is assumed to be 1; therefore, a cache line from which data has been read is invalidated. In the L2 full/main save state 22, when the processor 100-1 performs a write, the processor 100-1 performs a write directly to the main memory 300, and the value of the main memory capacity counter 440 is incremented by "1". At this time, when cnt+excnt=size-1 is established, transition to the full state 30 takes place.

In the full state 30, in the case of only a write operation, the operation is blocked, and state transition does not occur. In the full state 30, when the processor 100-2 performs a read from the shared cache 200, the value of the shared cache capacity counter 430 is decremented by "1", and transition to the L2 nonfull/main save state 23 takes place. Moreover, in the full state 30, data to be transferred may not be stored in the shared cache 200 and all of the data may be stored in the main memory 300. In this case, a prefetch from the main memory 300 to the shared cache 200 is performed, and the value of the shared cache capacity counter 430 is incremented by "1", and the value of the main memory capacity counter 440 is decremented from "0" to "1", and state transition to the L2 nonfull/main save state 23 takes place.

In the L2 nonfull/main save state 23, when the processor 100-1 performs a write, and cnt+excnt=size-1 is established at this time, transition to the full state 30 takes place. In the L2 nonfull/main save state 23, a prefetch request is automatically issued from the pre-fetch control section 400 to the shared cache 200. After that, when a notification of a prefetch completion from the shared cache 200 is received, the value of the shared cache capacity counter 430 is incremented by "1", and the value of the main memory capacity counter 440 is decremented by "1". Moreover, when the processor 100-1 performs a write, the value of the main memory capacity counter 440 is incremented by "1", and data is directly stored in the main memory. When the processor 100-2 performs a read from the shared cache 200, the value of the shared cache capacity counter 430 is decremented by "1". However, in the case where the value of the shared cache capacity counter 430 is "0" at the time of performing a read, completion of the prefetch is awaited. When the value of the main memory capacity counter 440 is changed to "0" after the prefetch operation, transition to the L2 only state 21 takes place.

Thus, in state transition from one of the five states to another, when the pre-fetch control section 400 is in the L2 nonfull/main save state 23, or when the pre-fetch control section 400 is in the full state 30 and all data to be transferred is stored in the main memory 300, the prefetch occurrence condition is satisfied. Then, when the prefetch is performed, data is filled into the shared cache 200 from the main memory 300.

[Designation of FIFO Storage Region]

As another technique of achieving transfer of the above-described data with a size exceeding the cache capacity, designation of the FIFO storage region will be described below. In this technique, the number of times for reference is assumed to be one.

Figure 15:
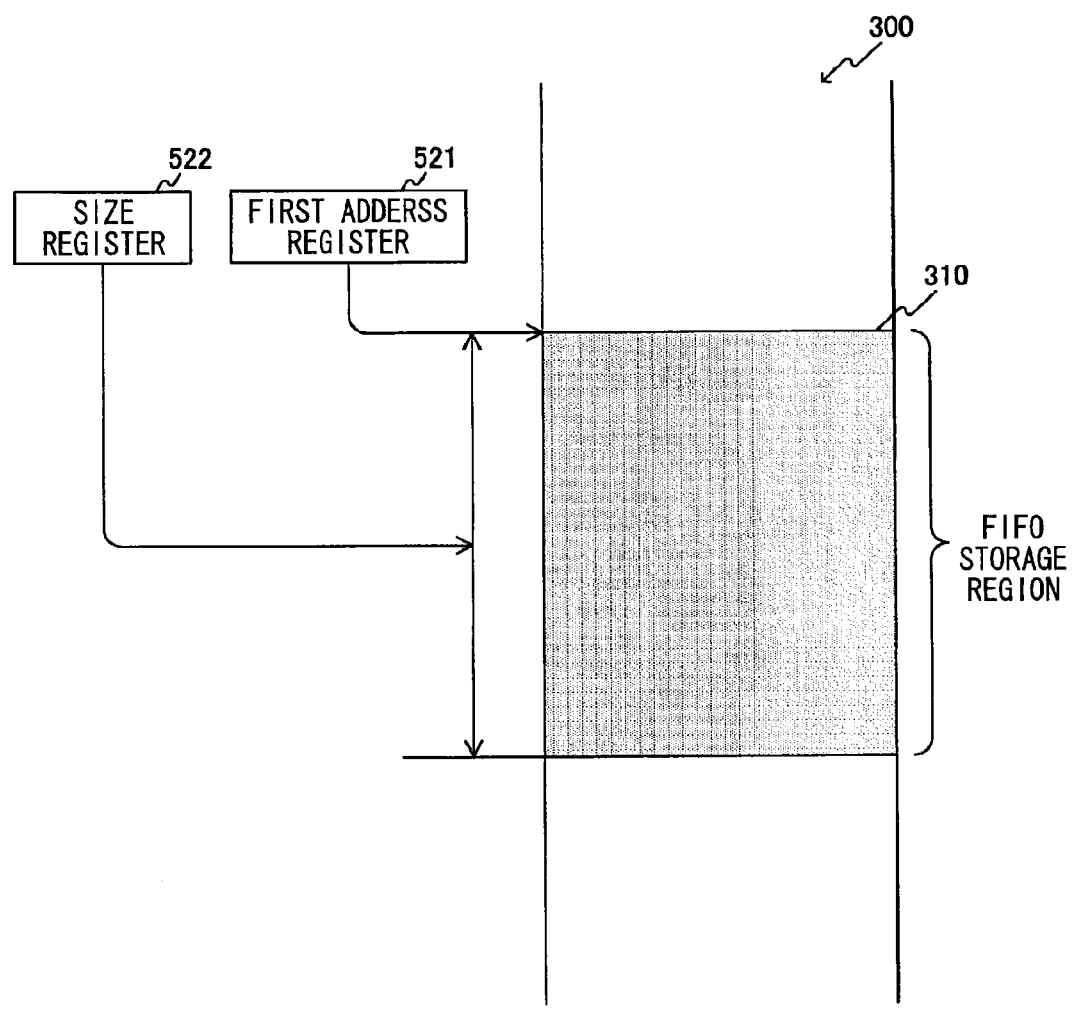
FIG. 15 is a diagram illustrating a second example of the relationship between the main memory and the FIFO storage region according to the first embodiment of the invention.

FIG. 15 is a diagram illustrating a second example of the relationship between the main memory 300 and the FIFO storage region 310 according to the first embodiment of the invention. In this example, a first address register 521 holding a first address and a size register 522 holding a size are provided to designate a storage region used as a FIFO in the shared cache 200. It is to be noted that the first address register 521 and the size register 522 are examples of a region designation register as recited in the appended claims.

When the values of the reference number fields 224 in all of the ways are set to a value other than "0" as a comparison result in the tag control section 230, data is directly stored in the main memory 300 through the uncache path. In the first example, at this time, the number of times for reference is also saved; however, in the second example, it is not necessary to save the number of times for reference in the main memory 300.

In the second example, in the case where a data fill into the shared cache 200 from the main memory 300 takes place in response to a read request from a processor, when a corresponding address is present in the designated storage region, the value of the reference number field 224 is set to "1" in the data fill. In typical FIFO, data having been read once is not necessary, and it is not an issue that the number of times for reference is one, and it is also not necessary to save the number of times for reference in the main memory 300, thereby enabling to reduce an area on an LSI.

In the second example, a procedure in a write is similar to that described above referring to FIG. 8, and will not be further described, and a procedure in a read will be described below.

Figure 16:
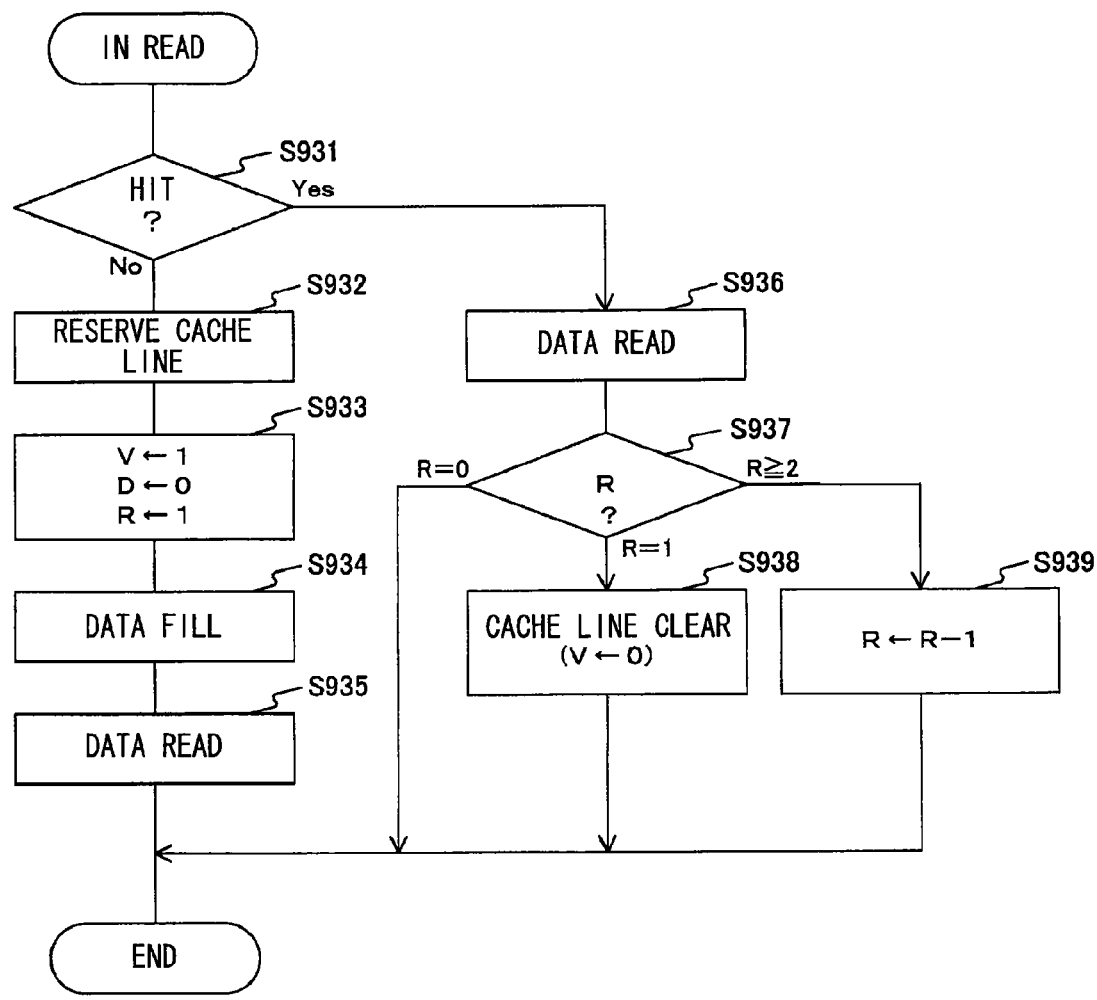
FIG. 16 is a diagram illustrating a procedure in a read from the shared cache when the FIFO storage region is specified according to the first embodiment of the invention.

FIG. 16 is a diagram illustrating a procedure in a read from the shared cache 200 when the FIFO storage region is designated according to the first embodiment of the invention.

An operation (steps S936 to S939) in the case where a cache hit is detected from a comparison result in the tag control section 230 (step S931) is similar to the procedure (the steps S926 to S929) described above referring to FIG. 9.

Moreover, an operation (steps S932 to S935) in the case where a miss hit is detected (step S931) is also substantially similar to the procedure (the step S922 to S925) described above referring to FIG. 9. However, this example is different in that the value of the reference number field 224 is set to "1" in the step S933. Therefore, the need for saving the number of times for reference in the reference number storage region 320 is allowed to be eliminated.

Effects of First Embodiment

According to the first embodiment of the invention, the value of the reference number field 224 of the tag storage section 220 is decremented after each read access, and when the value is changed from "1" to "0", the cache line is allowed to be invalidated. Therefore, the cache memory is allowed to operate as a shared FIFO between processors.

2. Second Embodiment

In the above-described first embodiment, the reference number field 224 is included in the tag storage section 220; however, in a second embodiment, the number of times for reference is stored in the data storage section 240. The assumed configurations of the shared cache and the information processing system are similar to those described in the first embodiment referring to FIGS. 1 to 4, and will not be further described.

[Configuration of Tag Storage Section 220]

Figure 17:
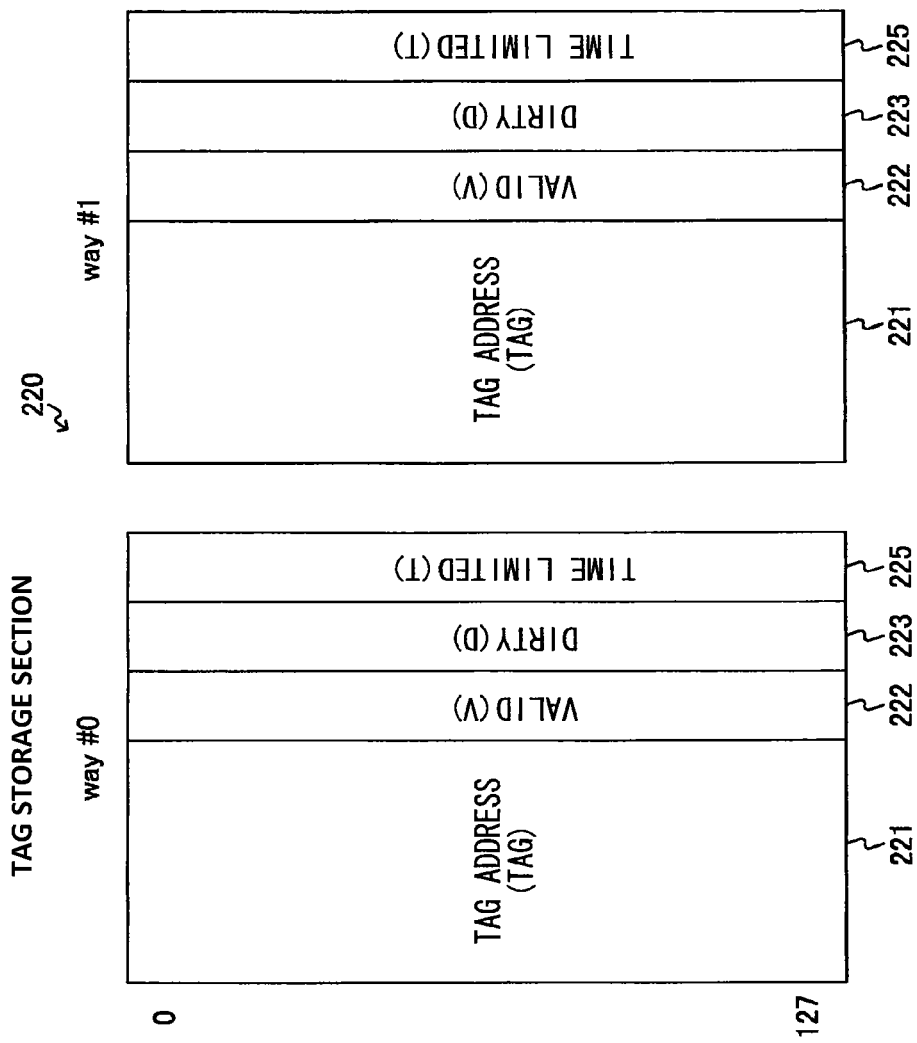
FIG. 17 is a diagram illustrating a field configuration example of a tag storage section according to a second embodiment of the invention.

FIG. 17 is a diagram illustrating a field configuration example of the tag storage section 220 according to the second embodiment of the invention. Each entry in the tag storage section 220 includes fields, i.e., the tag address field 221, the valid field 222, the dirty field 223, and a time limited field 225. The tag address field 221, the valid field 222, and the dirty field 223 are similar to those described in the first embodiment referring to FIG. 5, and will not be further described.

The time limited field 225 holds a time-limitation flag (time limited) which indicates whether or not a cache line corresponding to the entry is time-limited. In the drawing, the time limited field 225 is labeled as "T" for short. As will be described later, the number of times for reference is stored in a cache line of which the time limited field 225 indicates that the cache line is limited of the data storage section 240.

It is to be noted that the value of each field of the tag storage section 220 is set when handling a cache miss associated with the occurrence of the cache miss, and is updated in a subsequent handling process, as necessary.

[Configuration of Data Storage Section 240]

Figure 18:
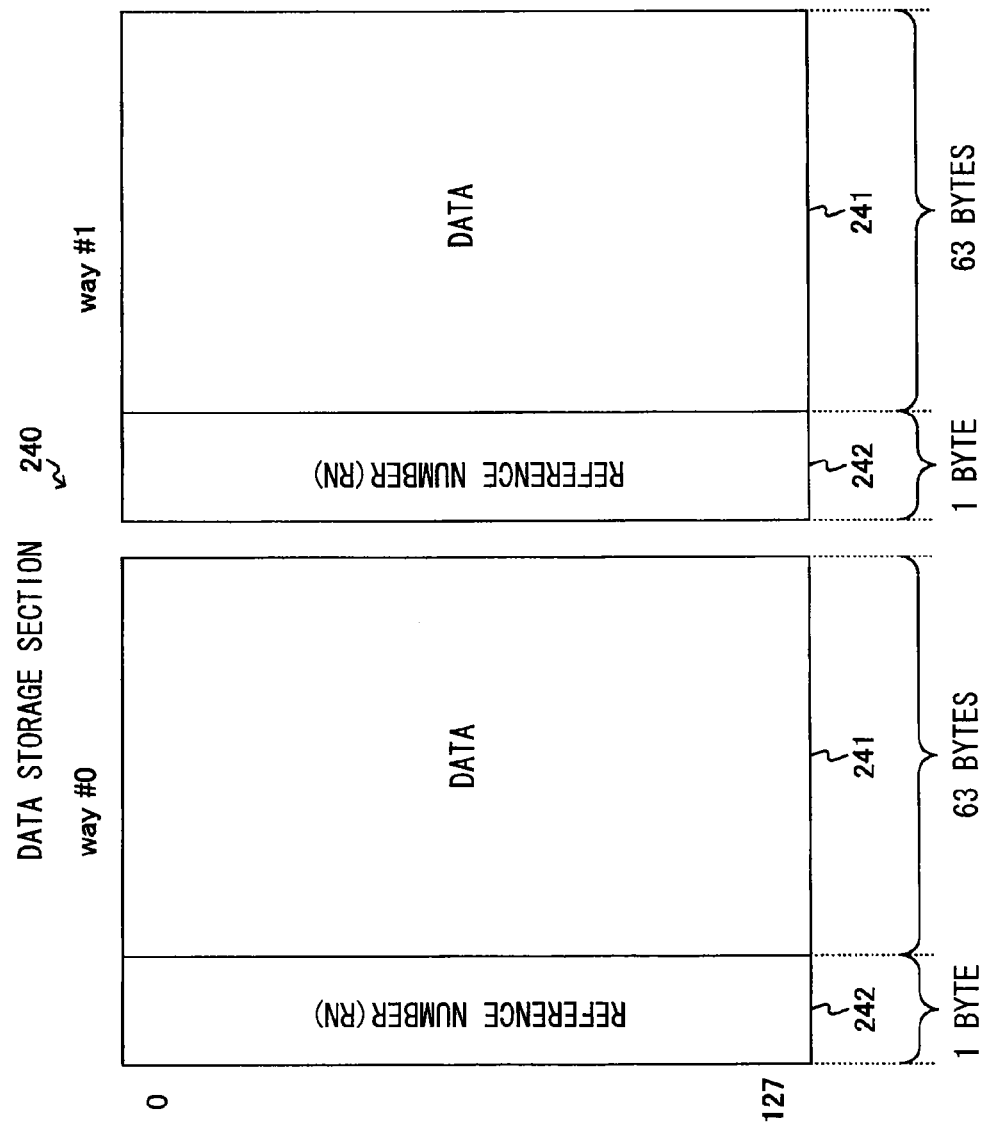
FIG. 18 is a diagram illustrating a field configuration example of a data storage section according to the second embodiment of the invention.

FIG. 18 is a diagram illustrating a field configuration example of the data storage section 240 according to the second embodiment of the invention. As described above, the data storage section 240 includes two ways #0 and #1 each configured of 128 cache lines which each hold 64-byte line data. Higher-order 1 byte of the 64-byte line data is allocated to a reference number field 242, and lower-order 63 bytes of the 64-byte line data are allocated to data 241. It is to be noted that allocation of 1 byte and 63 bytes is an example, and allocation may be adjusted, as necessary.

The reference number field 224 holds a remaining number of times for reference (reference number), which is a remaining number of times the cache line corresponding to the entry is supposed to be retrieved for reference, and in this example, the reference number field 224 holds an integer value ranging from "0" to "255". In the drawing, the reference number field 242 is labeled as "RN" for short. The reference number field 242 is valid only when the value of the time limited field 225 of the corresponding cache line is "1". When the value of the time limited field 225 is "0", the reference number field 242 does not have a special meaning, and a whole of the 64-byte line data is treated as data. In other words, the cache line has one of two types of configurations, depending on the value of the time limited field 225.

The reference number field 242 is set concurrently with a write of data to be transferred as the data 241 to the cache line. When a read access is performed in the case where the value of the reference number field 242 is "2" or greater, the value stored in the reference number field 224 is decremented by "1". Then, when a read access is performed in the case where the value of the reference number field 224 is "1", the cache line is invalidated after the read access. At this time, a write-back to the main memory 300 is not performed.

[Operation of Shared Cache 200]

In the second embodiment of the invention, operations of the tag control section 230 and the data control section 250 will be separately described as an operation of the shared cache 200.

Figure 19:
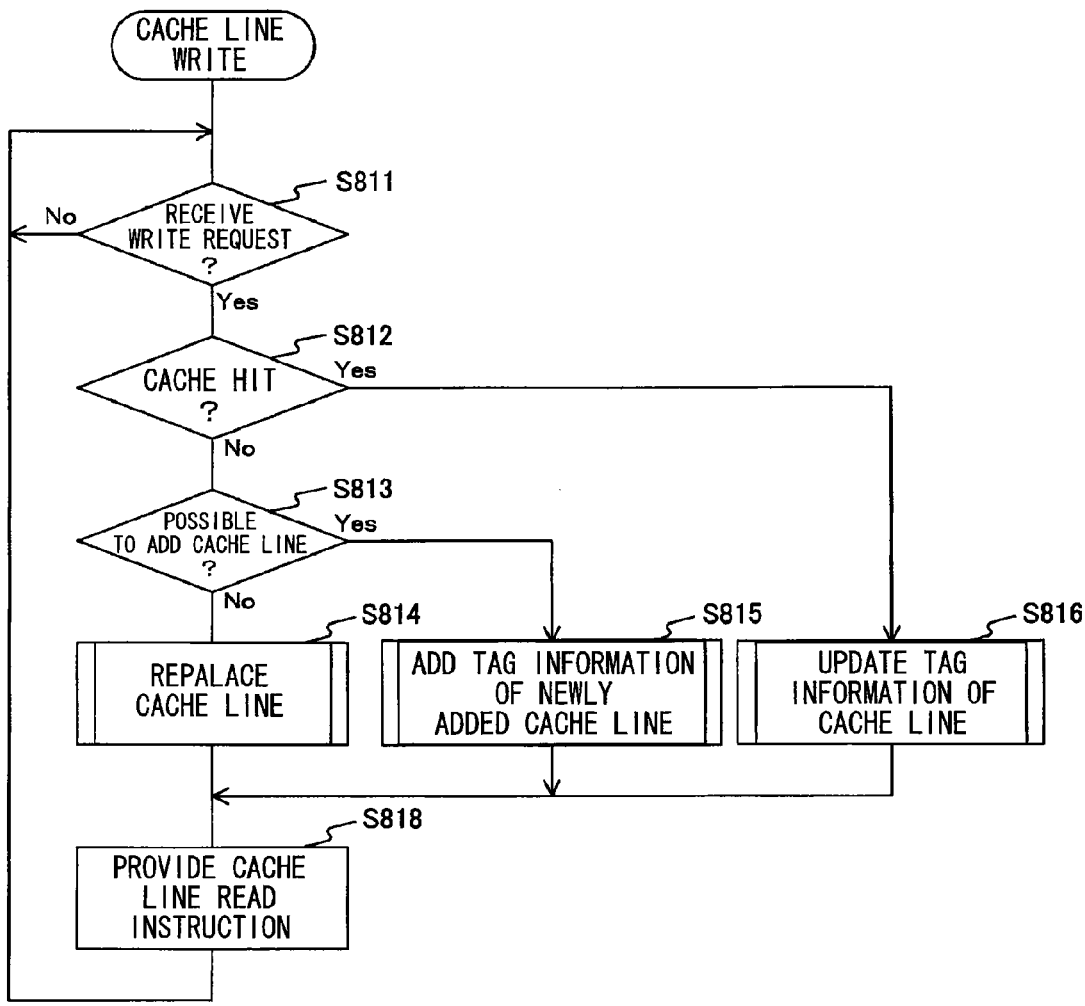
FIG. 19 is a diagram illustrating a procedure in a cache line write of a tag control section according to the second embodiment of the invention.

FIG. 19 is a diagram illustrating a procedure in a cache line write of the tag control section 230 according to the second embodiment of the invention.

When the tag control section 230 receives a cache line write request from the processor 100 (step S811), a read from the tag storage section 220 is performed based on an address of a cache line included in the cache line write request to determine whether a cache hit or a miss hit occurs. It is to be noted that the cache line write request includes designation of an address and a type of a cache line.

When a cache hit occurs (step S812), the tag control section 230 updates tag information of a cache line where the cache hit occurs stored in the tag storage section 220 (step S816). In the cache line to be updated, the valid field 222 is set to "1". Then, the tag control section 230 notifies the data control section 250 about a storage location of the cache line where the cache hit occurs in the data storage section 240 to provide a cache line write instruction (step S818).

When a cache miss occurs (step S812), the tag control section 230 determines whether or not a cache line where the cache miss occurs is allowed to be added to the data storage section 240.

When the cache line where the cache miss occurs is allowed to be added to the data storage section 240 (step S813), the tag control section 230 adds tag information of the cache line where the cache miss occurs to the tag storage section 220 (step S815). In the cache line to be added, the valid field 222 is set to "1", and the dirty field 223 is set to "1". Moreover, depending on the type of the cache line included in the request, when the cache line is time-limited, the time limited field 225 is set to "1", and when the cache line is not time-limited, the time limited field 225 is set to "0". Then, the tag control section 230 notifies the data control section 250 about a storage location of the cache line where the cache miss occurs in the data storage section 240 to provide a cache line write instruction (step S818).

When the missed cache line is not allowed to be added to the data storage section 240 (step S813), a cache line replacement process is performed to reserve an addition region for the cache line (step S814). Then, the tag control section 230 notifies the data control section 250 about a storage location of the missed cache line in the data storage section 240 to provide a cache line write instruction (step S818).

Figure 20:
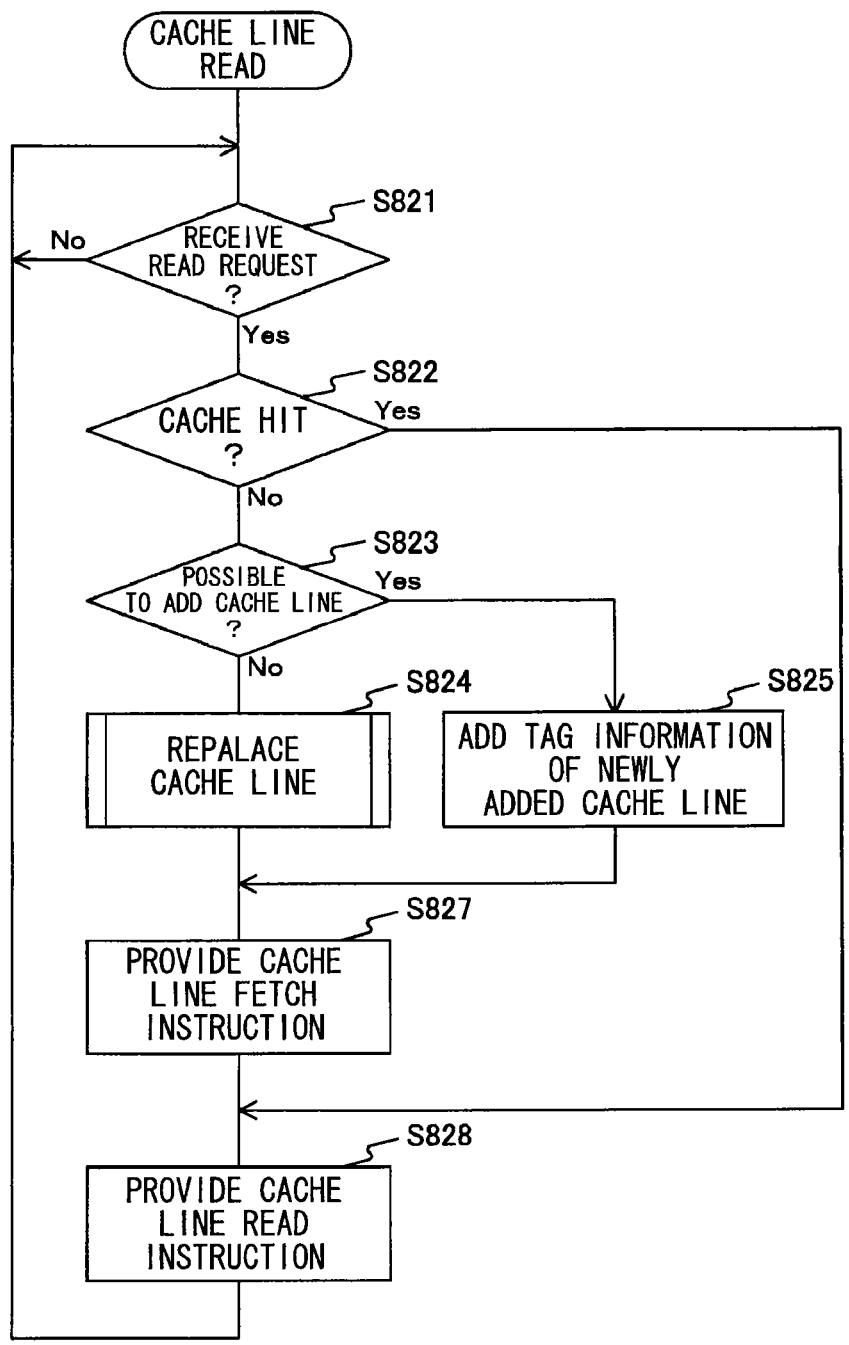
FIG. 20 is a diagram illustrating a procedure in a cache line read of the tag control section according to the second embodiment of the invention.

FIG. 20 is a diagram illustrating a procedure in a cache line read of the tag control section 230 according to the second embodiment of the invention.

When the tag control section 230 receives a cache line read request from the processor 100 (step S821), a read from the tag storage section 220 is performed based on an address of a cache line included in the cache line read request to determine whether a cache hit or a miss hit occurs. The cache line read request includes designation of an address and a type of a cache line. If all of conditions that the tag address field 221 matches the address included in the request, the value of the valid field 222 is "1", and the type of the time limited field 225 matches the type included in the request are satisfied, it is determined that a cache hit occurs, and if not, it is determined that a cache miss occurs.

When the cache hit occurs (step S822), the tag control section 230 notifies the data control section 250 about a storage location, a kind, and a supply destination of a cache line where the cache hit occurs in the data storage section 240. Accordingly, a cache line read request is made (step S828).

When the cache miss occurs (step S822), the tag control section 230 determines whether or not the cache line where the cache miss occurs is allowed to be added to the data storage section 240.

When the cache line where the cache miss occurs is allowed to be added (step S823), the tag control section 230 adds tag information of the cache line where the cache miss occurs to the tag storage section 220 (step S825). In the cache line to be added, a tag calculated from the address of the cache line where the cache miss occurs is stored in the tag address field 221. Moreover, the valid field 222 is set to "1", and the dirty field 223 is set to "0". Further, depending on the type of the cache line included in request, when the cache line is time-limited, the time limited field 225 is set to "1", and when the cache line is not time-limited, the time limited field 225 is set to "0". After that, the tag control section 230 notifies the data control section 250 about a location where the cache line where the cache miss occurs is to be stored in the data storage section 240, and an address of the cache line in the main memory 300, and makes a cache line fetch request (step S827). Then, the tag control section 230 notifies the data control section 250 about a storage location, a type, and a supply destination of the cache line where the cache miss occurs in the data storage section 240 to make a cache line read request (step S828).

When the cache line where the cache miss occurs is not allowed to be added (step S823), the tag control section 230 executes a cache line replacement process to reserve an addition region for the cache line (step S824). Then, the tag control section 230 notifies the data control section 250 about a storage location of the cache line where the cache miss occurs in the data storage section 240 and an address of the cache line in the main memory 300 to make a cache line fetch request (step S827). Then, the tag control section 230 notifies the data control section 250 about the storage location of the cache line where the cache miss occurs in the data storage section 240, a type of the cache line, and a supply destination of the cache line to make a cache line read request (step S828).

Figure 21:
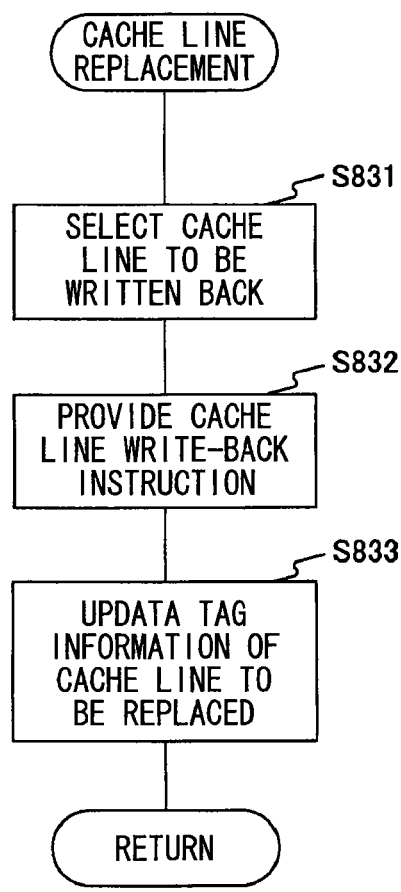
FIG. 21 is a diagram illustrating a procedure in cache line replacement of the tag control section according to the second embodiment of the invention.

FIG. 21 is a diagram illustrating a procedure in cache line replacement of the tag control section 230 according to the second embodiment of the invention. The procedure corresponds to the step S814 in FIG. 19 or the step S824 in FIG. 20.

When addition of a cache line is needed by a cache miss, the tag control section 230 determines whether or not the cache line is allowed to be added to the data storage section 240. At this time, when the cache line is not allowed to be added, one of cache lines held at present is selected, and the selected cache line is written back to the main memory 300 to reserve a free-space region, and a new cache line is stored in the free-space region. This is a cache line replacement process.

When cache line replacement is necessary, the tag control section 230 selects a cache line to be written back to the main memory 300 based on tag information of the tag storage section 220 (step S831). As described above, to select the cache line, a method of evicting a least-recently-used cache line (LRU policy) is allowed to be used.

Next, the tag control section 230 notifies the data control section 250 about a storage location of the selected cache line in the tag storage section 220, a type of the cache line, and an address where the cache line is to be written back to the main memory 300. Consequently, a cache line write-back request is made (step S832).

Then, the tag control section 230 replaces tag information of the selected cache line with tag information of the cache line where the miss hit occurs (step S833). In tag information after replacement, a tag calculated from the address of the cache line where the miss hit occurs is stored in the tag address field 221. Moreover, the valid field 222 is set to "1". When the cache miss is caused by a write access, "1" is stored in the dirty field 223, and when the cache miss is caused by a read access, "0" is stored in the dirty field 223. Further, depending on the type of the cache line included in the request, when the cache line is time-limited, the time limited field 225 is set to "1", and when the cache line is not time-limited, the time limited field 225 is set to "0".

Figure 22:
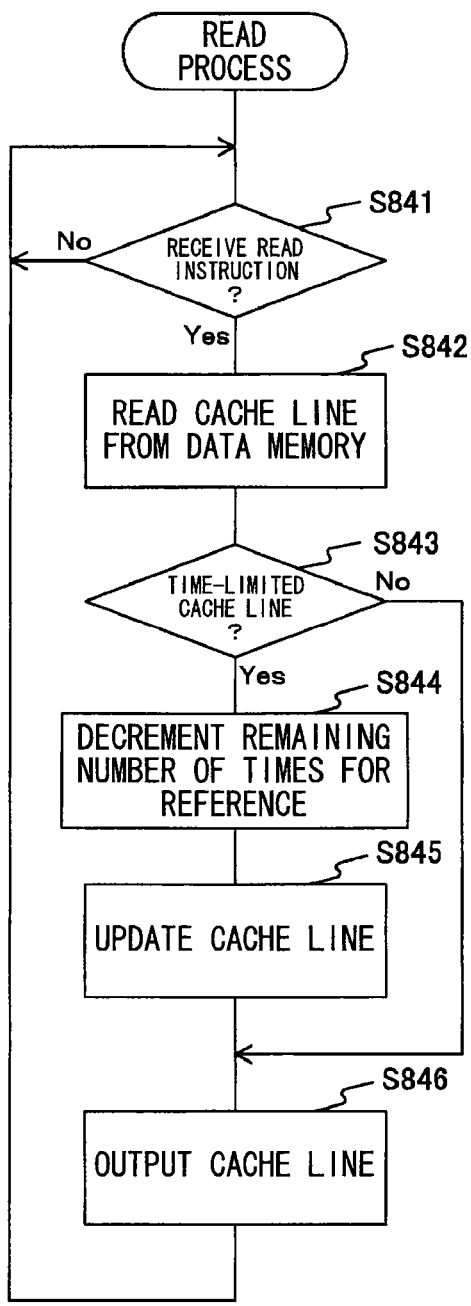
FIG. 22 is a diagram illustrating a procedure in a cache line read of a data control section according to the second embodiment of the invention.

FIG. 22 is a diagram illustrating a procedure in a cache line read of the data control section 250 according to the second embodiment of the invention.

When the data control section 250 receives a cache line read instruction from the tag control section 230 (step S841), a cache line at a location designated by the tag control section 230 in the data storage section 240 is read (step S842). When a target for the read instruction from the tag control section 230 is a time-limited cache line (step S843), the data control section 250 decrements the value of the read reference number field 242 by "1" (step S844) to write back the value of the reference number field 242 to the data storage section 240 (step S845). Then, the data control section 250 outputs the time-limited cache line to the processor 100 (step S846). When a target for the read instruction from the tag control section 230 is a normal cache line (step S843), the data control section 250 outputs a cache line read from a location designated by the tag control section 230 in the data storage section 240 (step S846).

Figure 23:
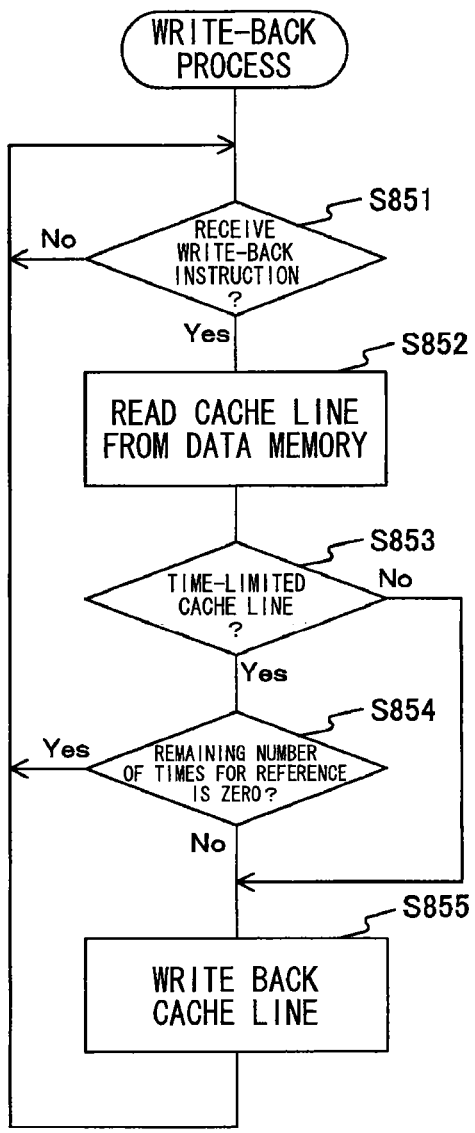
FIG. 23 is a diagram illustrating a procedure in a cache line write-back of the data control section according to the second embodiment of the invention.

FIG. 23 is a diagram illustrating a procedure in a cache line write-back of the data control section 250 according to the second embodiment of the invention.

When the data control section 250 receives a cache line write-back instruction from the tag control section 230 (step S851), a cache line at a location designated by the tag control section 230 in the data storage section 240 is read (step S852). When a target for the write-back instruction from the tag control section 230 is a time-limited cache line (step S853), the data control section 250 confirms the value of the reference number field 242 read from the data storage section 240. Then, when the value of the reference number field 242 is zero, a cache line write-back process temporarily stops (step S854). When the value of the reference number 242 is not zero (step S854), the data control section 250 outputs the time-limited cache line and an address designated by the tag control section 230 to the main memory 300 (step S855). Consequently, the time-limited cache line is written to the designated address in the main memory 300.

Figure 24:
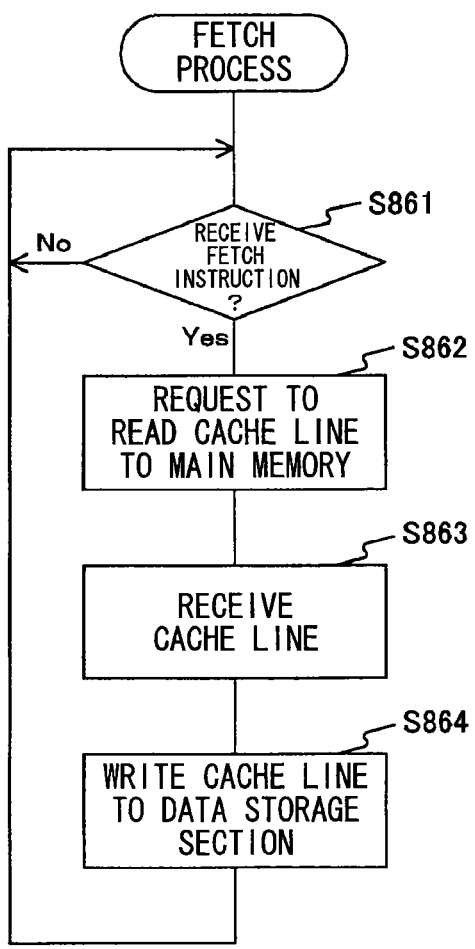
FIG. 24 is a diagram illustrating a procedure in a cache line fetch of the data control section according to the second embodiment of the invention.

FIG. 24 is a diagram illustrating a procedure in a cache line fetch of the data control section 250 according to the second embodiment of the invention.

When the data control section 250 receives a cache line fetch instruction from the tag control section 230 (step S861), the data control section 250 outputs the address designated by the tag control section 230 to the main memory 300. Consequently, a request to read data with a size equivalent to a cache line size from the designated address in the main memory 300 is made (step S862).

When transfer of a requested cache line starts, the data control section 250 receives the cache line to be transferred (step S863), and writes the received cache line to a location designated by the tag control section 230 in the data storage section 240 (step S864).

Figure 25:
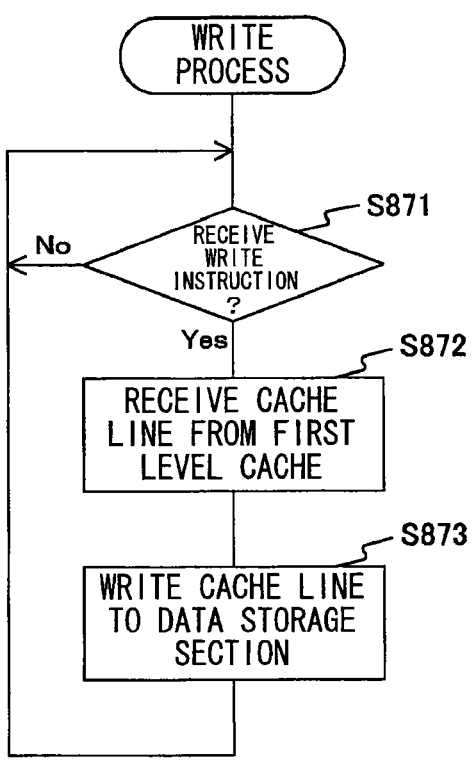
FIG. 25 is a diagram illustrating a procedure in a cache line write of the data control section according to the second embodiment of the invention.

FIG. 25 is a diagram illustrating a procedure in a cache line write of the data control section 250 according to the second embodiment of the invention.

When the data control section 250 receives a cache line write instruction from the tag control section 230 (step S871), the data control section 250 receives a cache line from the first level cache 110 of the processor 100 (step S872). Then, the data control section 250 writes the received cache line to a location designated by the tag control section 230 in the data storage section 240 (step S873).

Figure 26:
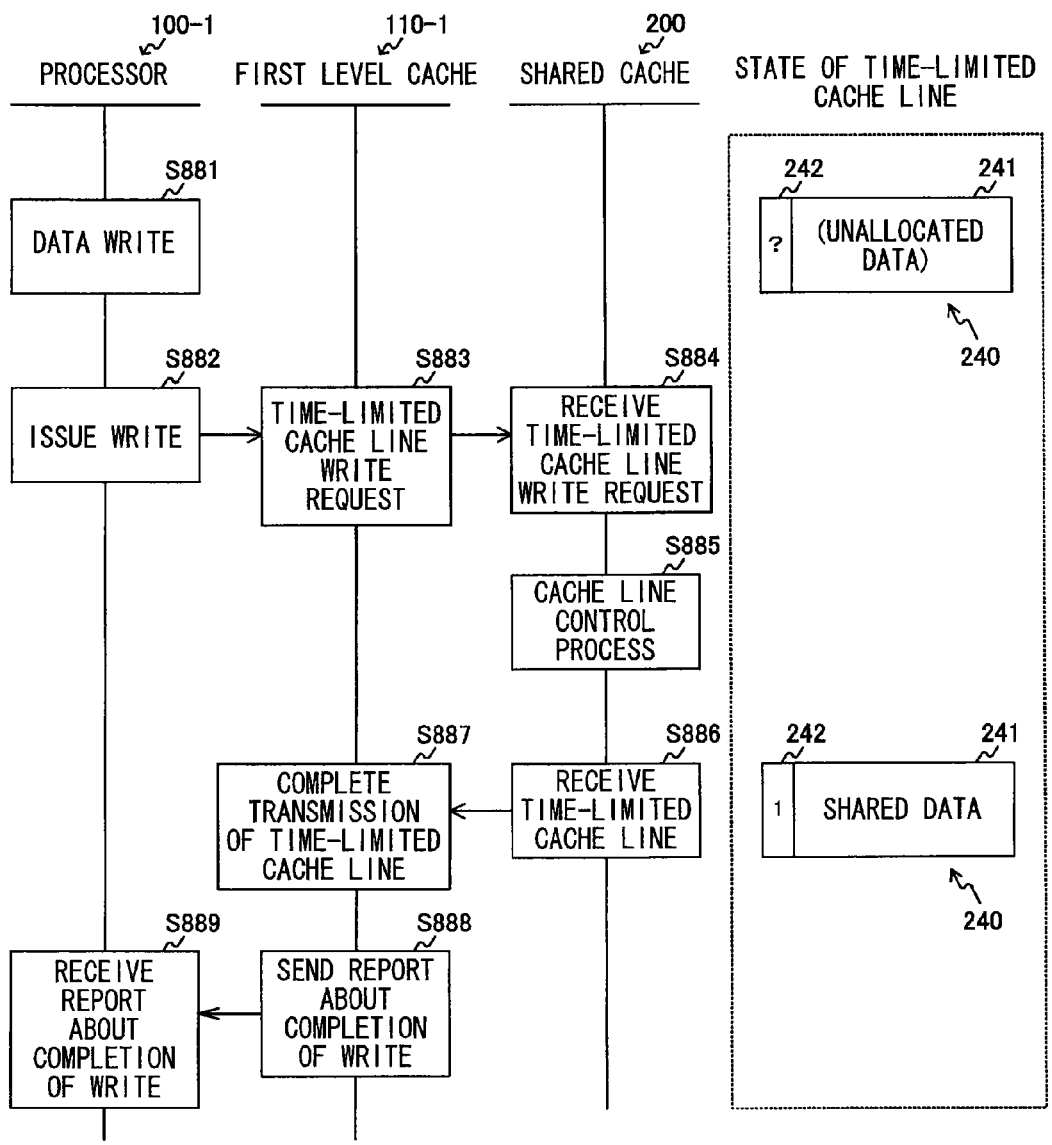
FIG. 26 is a diagram illustrating an example of a data write sequence to a shared cache according to the second embodiment of the invention.

FIG. 26 is a diagram illustrating an example of a data write sequence to the shared cache 200 according to the second embodiment of the invention.

The processor 100-1 writes "1" representing 1 as the number of times for reference to higher-order 1 byte in a cache line of the first level cache 110-1, and writes data to be transferred to the processor 100-2 to lower-order 63 bytes in the cache line of the first level cache 110-1 (step S881). Then, the first level cache 110-1 is instructed to write this working region as a time-limited cache line to the shared cache 200 (step S882).

The first level cache 110-1 designates a time-limited cache line as the type of the cache line to issue a cache line write request to the shared cache 200 (step S883). When the shared cache 200 receives the write request (step S884), the shared cache 200 executes determination of whether a cache hit or a miss hit occurs, and, as necessary, replacement of a cache line (step S885). Then, the shared cache 200 receives the time-limited cache line, and stores the received time-limited cache line in the data storage section 240 (step S886).

When the first level cache 110-1 completes transmission of the time-limited cache line (step S887), the first level cache 110-1 sends a report about the completion of the write of the time-limited cache line to the processor 100-1 (step S888). When the processor 100-1 receives the report, the write process is completed (step S889).

Figure 27:
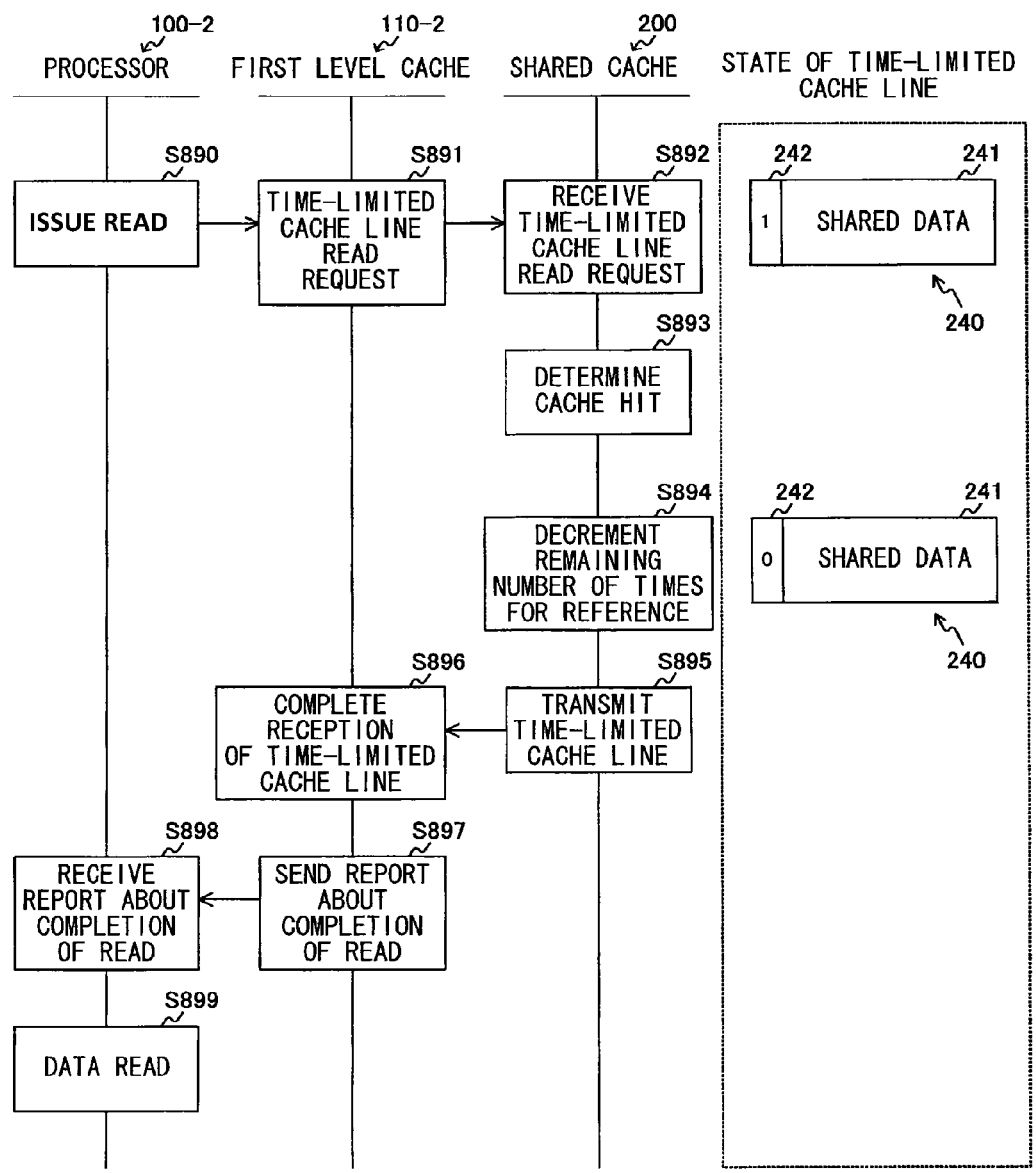
FIG. 27 is a diagram illustrating an example of a data read sequence from the shared cache according to the second embodiment of the invention.

FIG. 27 is a diagram illustrating an example of a data read sequence from the shared cache 200 according to the second embodiment of the invention. To refer data written by the processor 100-1, the processor 100-2 instructs the first level cache 110-2 to read a cache line (step S890). The first level cache 110-2 designates a time-limited cache line as the type of the cache line to issue a cache line read request to the shared cache 200 (step S891).

When the shared cache 200 receives the read request from the first level cache 110-2 (step S892), the shared cache 200 performs determination of whether a cache hit or a miss hit occurs (step S893). Then, the shared cache 200 reads a time-limited cache line where the cache hit occurs from the data storage section 240, and the shared cache 200 decrements the value of the reference number field 242 by "1" (step S894), and transmits the time-limited cache line to the first level cache 110-2 (step S895).

When the first level cache 110-2 completes the reception of the time-limited cache line (step S896), the first level cache 110-2 sends a report about the completion of the read of the time-limited cache line to the processor 100-2 (step S897). When the processor 100-2 receives the report about the completion of the read of the time-limited cache line from the first level cache 110-2 (step S898), a shared data read process starts (step S899).

In the step S894, the time-limited cache line of which the value of the reference number field 242 becomes zero is an unnecessary cache line which is not to be retrieved for reference, and is to be selected as a cache line to be replaced by the tag control section 230 in future. However, in the embodiment of the invention, when the value of the reference number 242 becomes zero, the cache line is not written back to the main memory 300 by the data control section 250, and is directly discarded.

Modification Examples

Modification examples described in the above first embodiment such as transfer of data with a size exceeding a cache capacity, a prefetch, and designation of the FIFO storage region are also applicable to the second embodiment, as necessary.

Effects of Second Embodiment

Thus, in the second embodiment of the invention, the value of the reference number field 242 of the data storage section 240 is decremented after each read access, and when the value is changed from "1" to "0", the cache line is allowed to be invalidated. Therefore, the cache memory is allowed to operate as a shared FIFO between processors.

3. Third Embodiment

In the above-described first embodiment, the reference number field 224 is included in the tag storage section 220; however, in a third embodiment, a usable amount and a lock bit are stored in the tag storage section 220. The assumed configurations of the information processing system and the shared cache are similar to those described in the first embodiment referring to FIGS. 1 to 4, and will not be further described.

[Configuration of Tag Storage Section 220]

Figure 28:
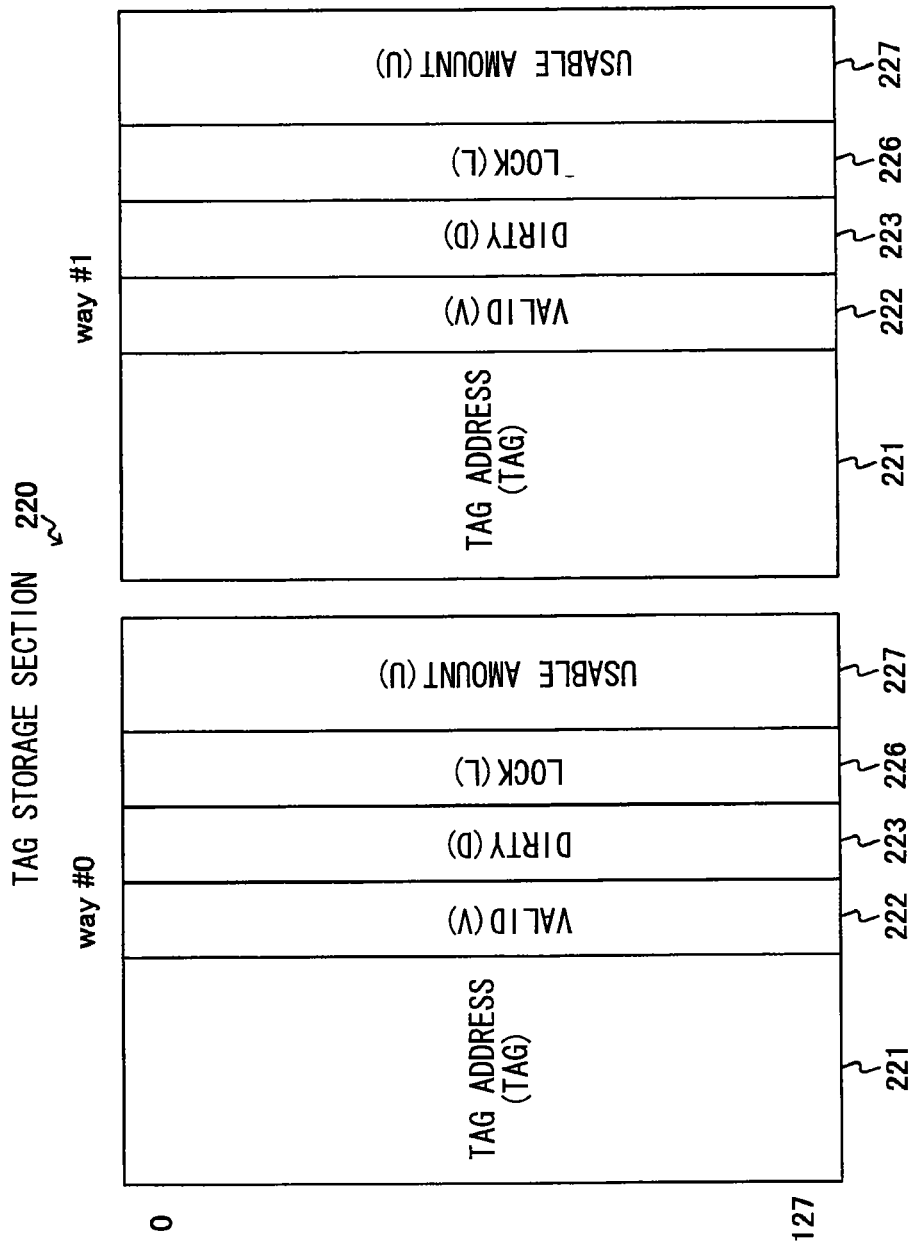
FIG. 28 is a diagram illustrating a field configuration example of a tag storage section according to a third embodiment of the invention.

FIG. 28 is a diagram illustrating a field configuration example of the tag storage section 220 according to the third embodiment of the invention. Each entry in the tag storage section 220 includes fields, i.e., the tag address field 221, the valid field 222, the dirty field 223, a lock field 226, and a usable amount field 227. The tag address field 221, the valid field 222, and the dirty field 223 are similar to those described in the first embodiment referring to FIG. 5, and will not be further described.

The lock field 226 holds a lock bit locking the entry to prevent the entry from being replaced. When the entry is set to a locked state (for example, "1") by a processor including the lock field 226, the entry is not replaced by an access from another unrelated processor. In other words, when a new cache line is necessary, a write-side processor turns the lock field 226 to the locked state, and when the cache line becomes unnecessary, a read-side processor turns the lock field 226 to an unlocked state. In the drawing, the lock field 226 is labeled as "L" for short.

The usable amount field 227 holds a usable amount of data (usable amount) of the entry in the data storage section 240. As a unit of the amount of data, as long as the unit is unified, an arbitrary unit is allowed to be used, and, for example, byte or block (4 bytes or 8 bytes) is allowed to be used as a unit. When 1 byte is used as the unit of the amount of data, it is necessary to allocate a 6-bit width to allow the usable amount field 227 to represent 64 bytes. In the drawing, the usable amount field 227 is labeled as "U" for short.

It is to be noted that the usable amount field 227 is allowed to be used singly without the lock field 226; however, when the usable amount field 227 is used with the lock field 226, a delay mechanism which will be described later is allowed to be used effectively.

[Operation of Shared Cache 200]

Figure 29:
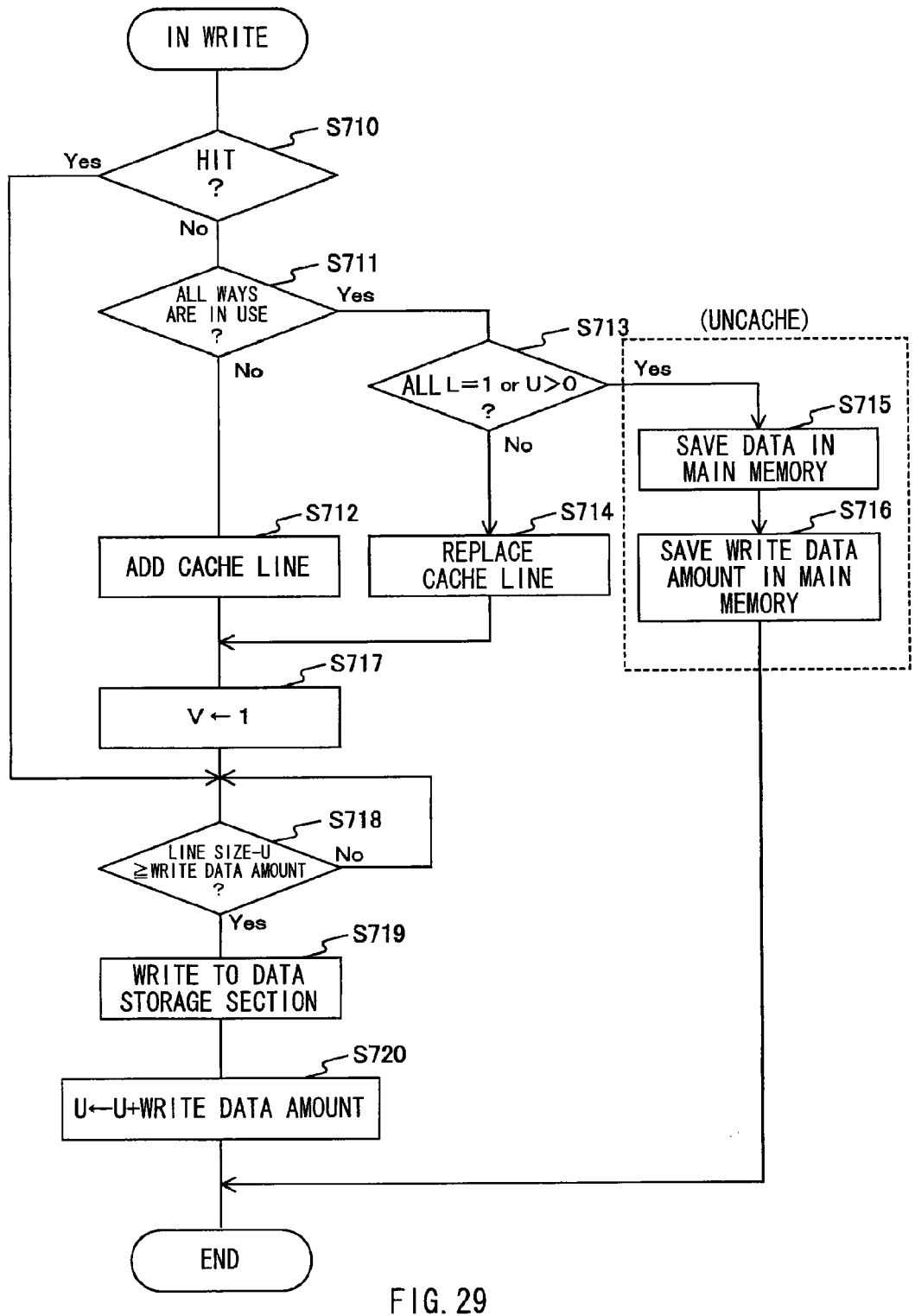
FIG. 29 is a diagram illustrating a procedure in a write to a shared cache according to the third embodiment of the invention.

FIG. 29 is a diagram illustrating a procedure in a write to the shared cache 200 according to the third embodiment of the invention.

When a cache hit is detected from a comparison result in the tag control section 230 (step S710), whether or not the cache line has a space where data is to be written is determined (step S718). More specifically, when a value obtained by subtracting the value of the usable amount field 227 from a line size (64 bytes) is not sufficient for a write data amount, a write operation stays on standby. On the other hand, when the value obtained by subtracting the value of the usable amount field 227 from the line size is equal to or greater than the write data amount, write data is written to the data storage section 240 (step S719). At this time, the write data amount is added to the usable amount field 227 (step S720).

On the other hand, when a miss hit is detected (step S710), and an unused way is present (step S711), a cache line is added (step S712), and the valid field 222 of the cache line is set to "1" (step S717). A following operation is similar to that when the cache hit is detected (steps S718 to S720).

When a miss hit is detected (step S710), the miss hit is treated as follows. When all of the ways are in use (step S711), and the lock fields 226 in all of the ways are locked, or the usable amount field 227 is set to a value greater than zero (step S713), data is not written to the shared cache 200. In other words, data and a write data amount are saved in the main memory 300 through an uncache path (steps S715 and S716). A save region on the main memory 300 is similar to that described in the first embodiment referring to FIG. 7, and in addition to the FIFO storage region 310, a write data amount storage region (not illustrated) is reserved. When all of the ways are in use, and a cache line of which the lock field 226 in one of the ways is unlocked or a cache line of which the usable amount field 227 is not set to a value greater than zero is present (step 713), the cache line is replaced (step S714). An operation after cache line replacement is similar to that when a cache line is added (step S717 to S720).

Figure 30:
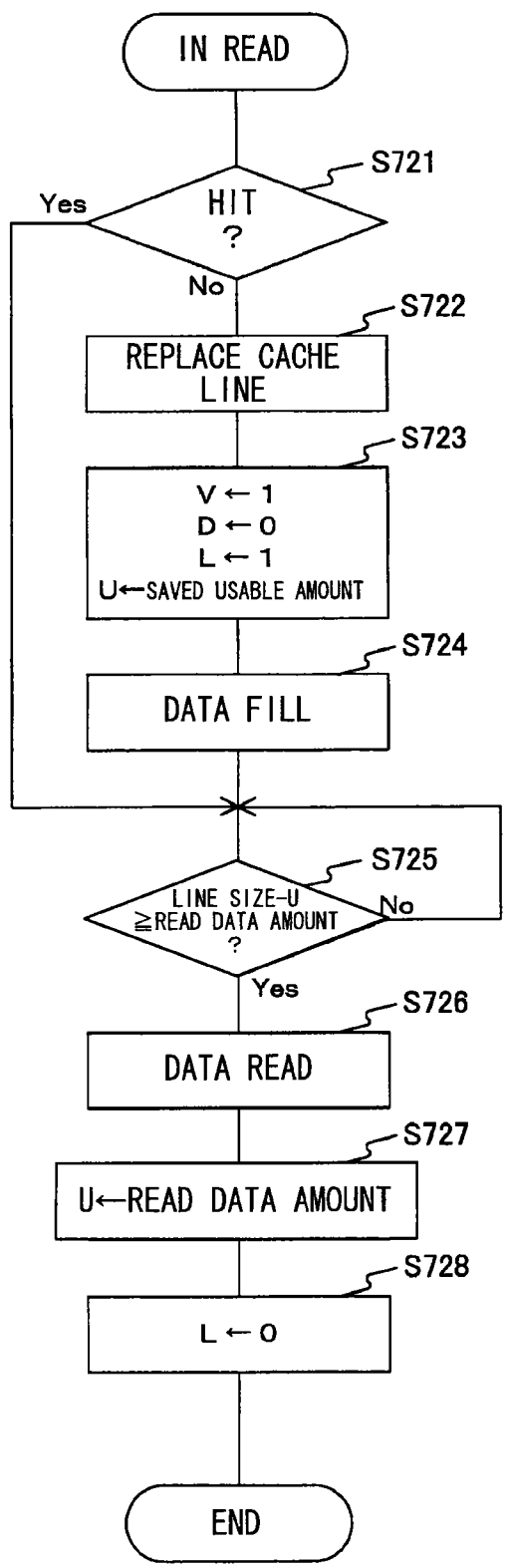
FIG. 30 is a diagram illustrating a procedure in a read from the shared cache according to the third embodiment of the invention.

FIG. 30 is a diagram illustrating a procedure in a read from the shared cache 200 according to the third embodiment of the invention.

When a cache hit is detected from a comparison result in the tag control section 230 (step S721), whether or not data is allowed to be read from a cache line where a cache hit is detected is determined (step S725). More specifically, when the value of the usable amount field 227 is smaller than the read data amount, a read operation stays on standby. On the other hand, when the value of the usable amount field 227 is equal to or greater than the read data amount, read data is read from the cache line of the data storage section 240 (step S926). At this time, the read data amount is subtracted from the value of the usable amount field 227 (step S727), and the lock field 226 is set to the unlocked state, i.e., "0" (step S728).

When a miss hit is detected from a comparison result in the tag control section 230 (step S721), the cache line is reserved (step S722), and the valid field 222 of the cache line is set to "1" (step S723). At this time, the dirty field 223 is set to "0", and the lock field 226 is set to "1" (lock), and the usable amount field 227 is set to the saved write data amount (step S723). Then, data is filled into the data storage section 240 from the FIFO storage region of the main memory 300 (step S724). A following operation is similar to that when a cache hit is detected (steps S725 to S728).

[Delay Update Mechanism]

Figure 31:
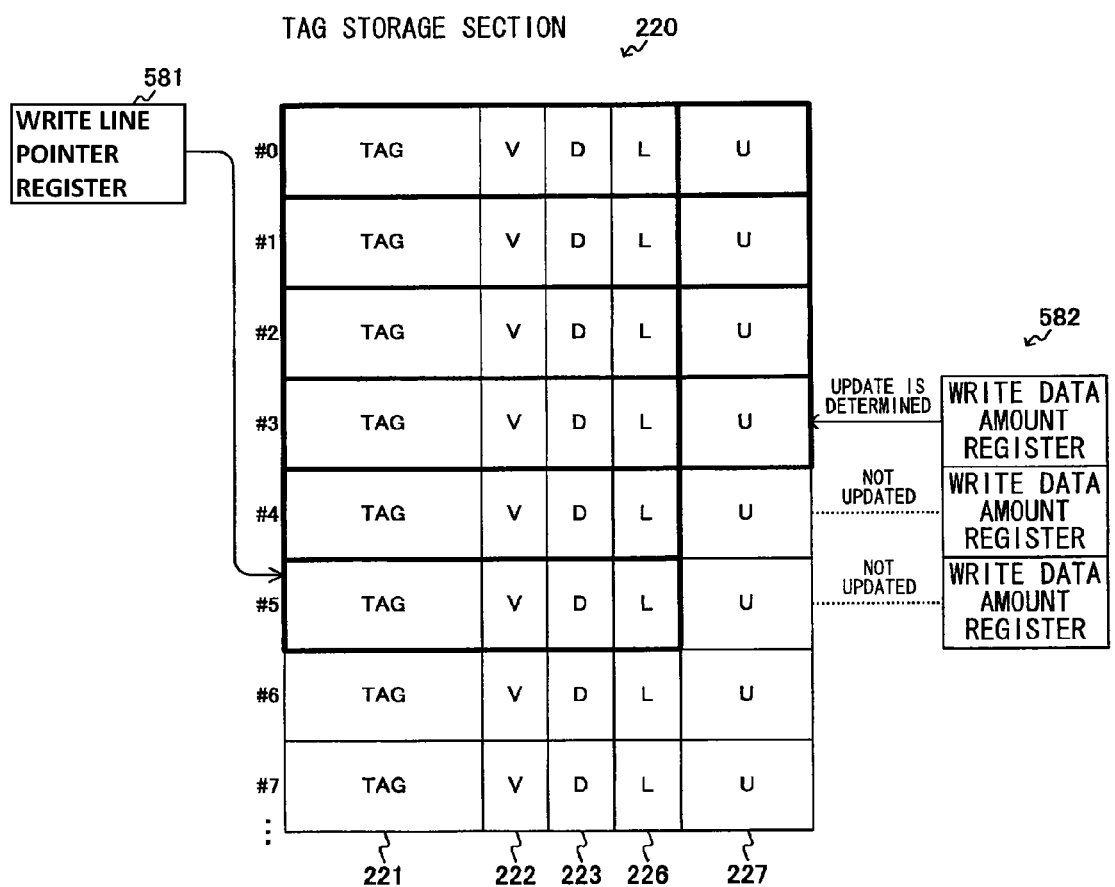
FIG. 31 is a diagram illustrating a state of a delay setting mechanism of a usable amount field according to the third embodiment of the invention.

FIG. 31 is a diagram illustrating a delay setting mechanism of the usable amount field 227 according to the third embodiment of the invention. It is assumed that, when a new cache line becomes necessary, and allocation is performed, a mechanism of delaying an update timing of the usable amount field 227 by N lines is added. Such a mechanism is referred to as a delay setting mechanism of the usable amount field 227. The delay setting mechanism allows a rewrite of data within N lines from a write end location. This drawing illustrates an example in which a two-line delay is assumed.

To achieve the delay setting mechanism, a write line pointer register 581 and a plurality of write data amount registers 582 are included. The write line pointer register 581 is a register holding the ordinal number of a cache line which is currently subjected to a write access. The write data amount registers 582 are registers holding a write data amount before the usable amount field 227 of a cache line to be delayed is determined.

The drawing illustrates a state where the write line pointer register 581 indicates a fifth cache line, and the usable amount field 227 of a third cache line is determined. The usable amount fields 227 of fourth and fifth cache lines are not set upon a write to the fifth cache line; therefore, a rewrite to a corresponding cache line is allowed. The write data amount which is supposed to be set to the usable amount fields 227 of the fourth and fifth cache lines is stored in the write data amount register 582, and is referred to with a change in the write line pointer register 581.

Figure 32:
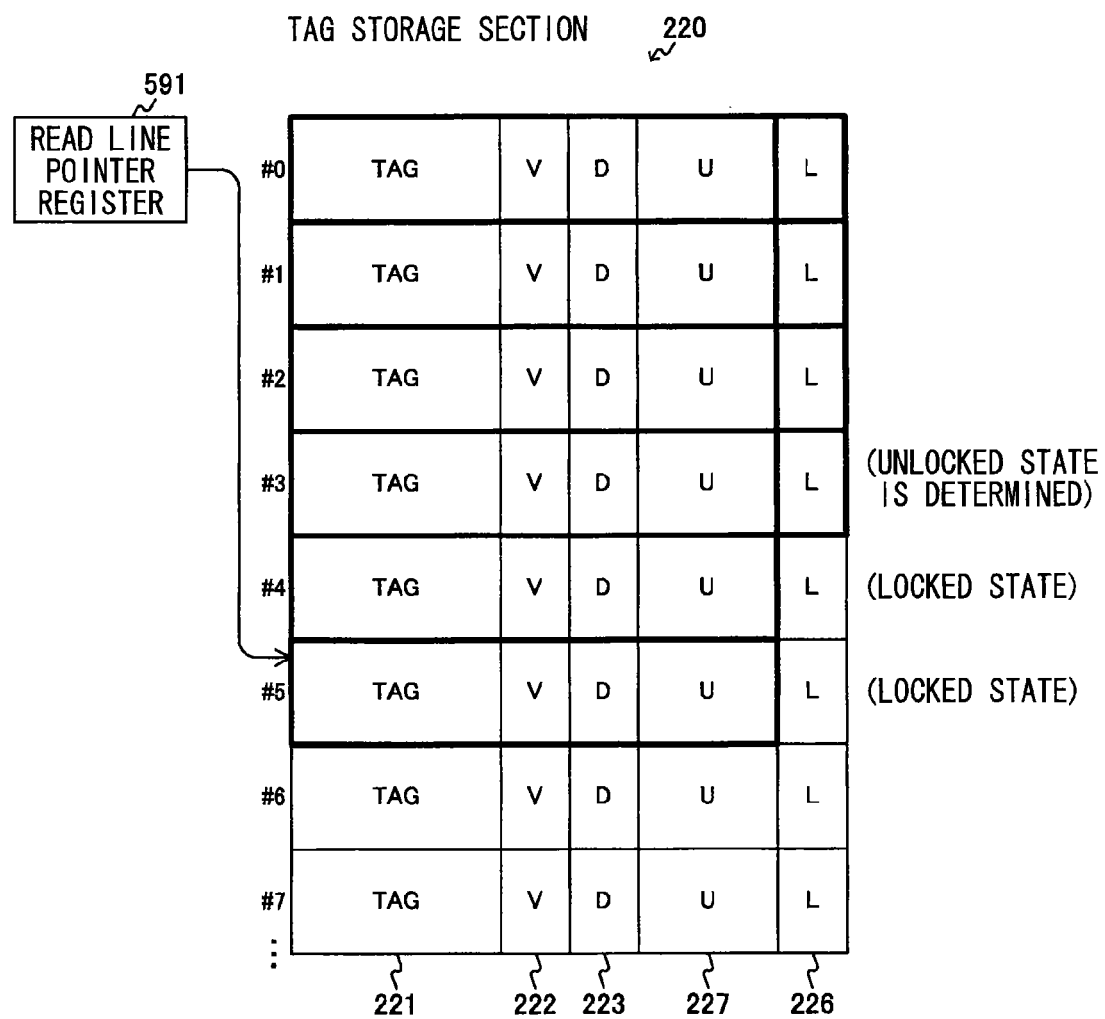
FIG. 32 is a diagram illustrating a state of a delay cancellation mechanism of a lock field according to the third embodiment of the invention.
Figure 36:
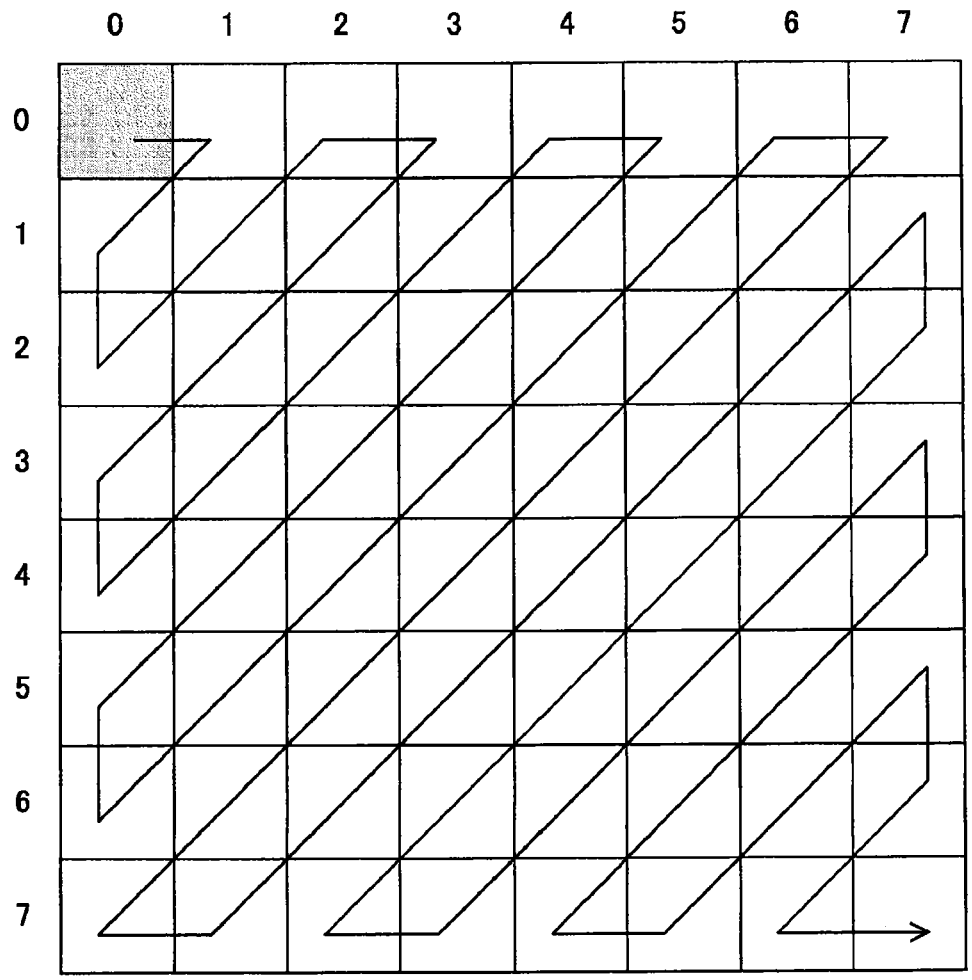
FIG. 36 is a diagram illustrating a pattern of zigzag scanning on IDCT coefficients in the typical codec.

FIG. 32 is a diagram illustrating a state of a delay cancellation mechanism of the lock field 226 according to the third embodiment of the invention. It is assumed that, when a read cache line becomes unnecessary and is unlocked, a mechanism of delaying an unlock timing by N lines is added. Such a mechanism of the lock field 226 is referred to as delay cancellation mechanism. The delay cancellation mechanism allows a rewrite of data within N lines from a read end location. This drawing illustrates an example in which a two-line delay is assumed.

To achieve the delay cancellation mechanism, a read line pointer register 591 is included. The read line pointer register 591 is a register holding the ordinal number of a cache line which is currently subjected to a read access.

The drawing illustrates a state where the read line pointer register 591 indicates a fifth cache line, and the unlocked state of the lock field 226 of a third cache line is determined. Fourth and fifth lock fields 226 are not yet unlocked upon a read from the fifth cache line; therefore, a reread from a corresponding cache line is allowed.

FIG. 33 is a diagram illustrating an example of data order change with use of a delay update mechanism according to the third embodiment of the invention. A combination of each command to be executed and a virtual FIFO state is illustrated. An entity of the virtual FIFO is stored in the shared cache 200. Herein, a FIFO including 8 cache lines is illustrated.

FIG. 33(*a*) illustrates a command executed by a write-side processor and a state upon execution of the command. It is assumed that a write-side processor sequentially performs a write on the FIFO from the left. A state where, upon a write of data D2 to a cache line, data D1 is written back to a cache line previous to the cache line in the process is illustrated. Typically, even if an attempt to write the data D1 is made, when the value of the usable amount field 227 is determined, data is not allowed to be written until the read-side processor performs a read; however, when setting of the usable amount field 227 is delayed, a write of the data D1 is allowed.

FIG. 33(*b*) illustrates a command to be executed by the read-side processor and a state upon execution of the command. The read-side processor sequentially performs a read on the FIFO from the left. As a result, the data D1 is allowed to be first read, and then the data D2 is allowed to be read. In other words, the data D1 and the data D2 are allowed to be read in an order different from the write order in the write-side processor. Therefore, cost of storing data in a memory and replacing data in the write-side processor or the read-side processor is allowed to be reduced.

FIG. 34 is a diagram illustrating an example of data size compression with use of the delay update mechanism according to the third embodiment of the invention. A combination of each command to be executed and a virtual FIFO state is illustrated. An entity of the virtual FIFO is stored in the shared cache 200. Herein, a FIFO including 8 cache lines is illustrated.

FIG. 34(*a*) illustrates a command to be executed by the write-side processor not using the delay update mechanism and a state upon execution of the command. First, 1-byte data D1 is written to a 0th byte of the FIFO. Next, 2-byte data D2 is written to second to third bytes of the FIFO. At this time, assuming that the usable amount field 227 holds an end location in the cache line, next 1-byte data D3 is to be written to a fourth byte.

FIG. 34(*b*) illustrates a command to be executed by the write-side processor using the delay update mechanism and a state upon execution of the command. In this case, when the data D1 and the data D2 are written, the value of the usable amount field 227 is not determined; therefore, the 1-byte data D3 is allowed to be written to a first byte. Thus, even if there are a plurality of sets of data with different data sizes, a free-space region in the FIFO is allowed to be used. Therefore, an unused region for data alignment is allowed to be reduced.

It is to be noted that an example in which the write order in the write-side processor is changed with use of the delay setting mechanism of the usable amount field 227 is described above; however, the read order is allowed to be changed with use of the delay cancellation mechanism of the lock field 226 by a similar technique.

[Application Example of Delay Update Mechanism to Codec]

An application example in which the above-described delay update mechanism is applied to an algorithm of a codec to perform optimization will be described below.

FIG. 35 is a diagram illustrating an IDCT (Inverse Discrete Cosine Transform) coefficient decoding process algorithm in a typical codec. In this original algorithm, IDCT coefficients of an 8×8-pixel block are obtained from a bit stream, and the obtained IDCT coefficients are scanned in zigzag order to be supplied to the FIFO as a one-dimensional coefficient sequence. Such a technique is also used in MPEG (Moving Picture Experts Group) and JPEG (Joint Photographic Experts Group).

FIG. 37 is a diagram illustrating an IDCT coefficient decoding process algorithm of a codec optimized by a technique in related art. In this algorithm, zigzag scanning is executed concurrently with IDCT coefficient decoding to perform optimization. However, in the case where this technique is adopted, it is necessary to change the order of a coefficient sequence obtained by zigzag scanning when the coefficient sequence is output to the FIFO, and it is necessary to include a buffer OF holding an intermediate result.

FIG. 38 is a diagram illustrating an IDCT coefficient decoding process algorithm of a codec using the delay update mechanism according to the third embodiment of the invention. In this algorithm, zigzag scanning is executed concurrently with IDCT coefficient decoding, and a coefficient sequence is output to the FIFO without a buffer holding an intermediate result. In other words, once initialization data is output to the FIFO, only a nonzero coefficient is allowed to be written to the FIFO; therefore, the buffer holding an intermediate result is allowed to be removed.

The IDCT coefficient has 128 bytes (8 pixels×8 pixels×2 bytes), and in the case where the cache line size is 64 bytes, 2 lines are used. In the delay update mechanism according to the third embodiment of the invention, a write to an arbitrary location in two lines is allowed to be performed a plurality of times; therefore, optimization of the algorithm is allowed to be performed with flexibility.

[Transfer of Data with Size Exceeding Cache Capacity]

Even in the third embodiment, data with a size exceeding the capacity of the shared cache 200 is allowed to be transferred between the processors 100. In other words, as in the case of the first embodiment, it is effective to add an uncache path not using the shared cache 200, and add the following control function in the data control section 250.

For example, it is assumed that the processor 100-1 writes data to the shared cache 200. When the amount of written data exceeds a certain amount, as a result of detection of a tag match in a write access in the tag control section 230, an event that the usable amount field 227 and the lock field 226 have been already set in all of the ways is caused. In this case, data is not written to the shared cache 200, and is directly stored in the main memory 300 through the uncache path. At this time, the write data amount is also saved with write data in the main memory 300.

After that, for example, the processor 100-2 reads data from the shared cache 200, and the data is filled into the shared cache 200 from the main memory 300. At this time, the usable amount field 227 is set to the saved write data amount. Consequently, a read access from the processor 100-2 is allowed.

At this time, in the case where the delay update mechanism is adopted, when the uncache path is used, it is necessary to determine the usable amount field 227 and the lock field 226 of which updates are delayed. In other words, in the delay setting mechanism of the usable amount field 227, the usable amount field 227 is not determined unless a write operation is performed, and likewise, in the delay cancellation mechanism of the lock field 226, the lock field 226 is not determined unless when a read operation is performed. Therefore, it is necessary to forcibly determine the usable amount field 227 and the lock field 226 not only when the data size exceeds the cache capacity, but also in last N lines in a normal access. Therefore, the following flush function is provided.

[Flush Function]

The shared cache 200 having the delay update mechanism has a flush function allowing the usable amount field 227 and the lock field 226 to be determined. In the case where a flush instruction is made in a write operation, the write data amount held in the write data amount register 582 is provided to the usable amount field 227 to determine the usable amount field 227, and an undetermined lock field 226 is determined to be in the locked state. In the case where a flush instruction is made in a read operation, all usable amount fields 227 are set to "0", and all lock fields 226 are determined to be in the unlocked state, thereby releasing cache lines.

Modification Examples

Modification examples described in the above first embodiment such as a prefetch, and designation of the FIFO storage region are also applicable to the third embodiment, as necessary.

Effects of Third Embodiment

Thus, in the third embodiment of the invention, the value of the usable amount field 227 is incremented after each write access and is decremented after each read access, thereby enabling to prevent data passing when the cache memory operates as a shared FIFO. Moreover, the lock field 226 is turned to the locked state in a write access and is turned to the unlocked state in a read access, thereby enabling to prevent cache line eviction by a third party. Further, when the delay update mechanism is provided to the usable amount field 227 and the lock field 226, data is allowed to be replaced when the cache memory is used as the shared FIFO.

4. Application Example

As described above, in the embodiments of the invention, the shared FIFO is allowed to be achieved on the cache memory. Therefore, as an application example using the shared FIFO, a digital television broadcast system will be described below.

Figure 39:
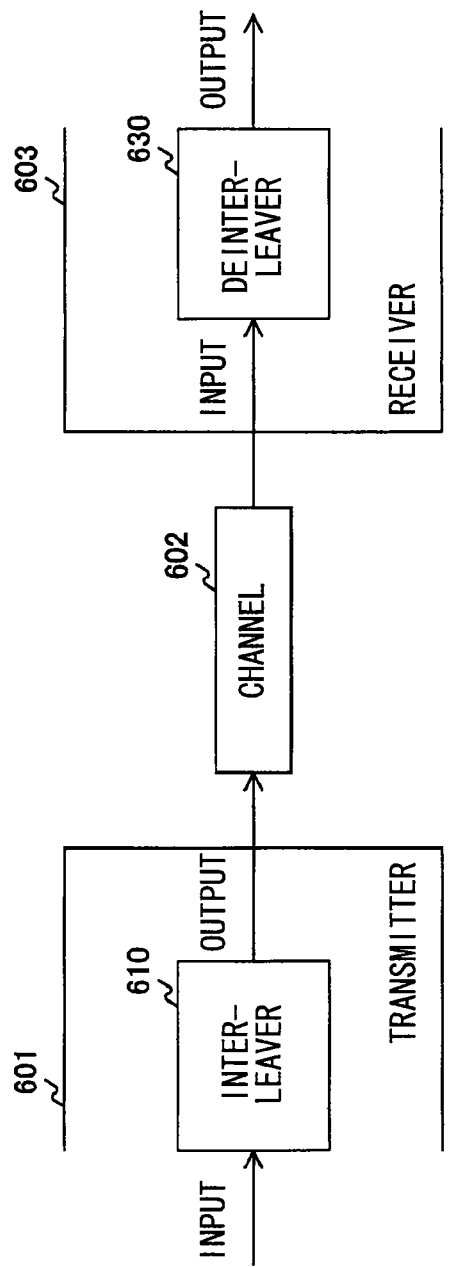
FIG. 39 is a diagram illustrating an example of a digital television broadcast system as an application example of the embodiments of the invention.

FIG. 39 is a diagram illustrating an example of the digital television broadcast system as an application example of the embodiments of the invention. In the digital television broadcast system, a digital television broadcast signal is transmitted from a transmitter 601 to a receiver 603 through a channel 602. The transmitter 601 transmits stream data of a transport stream. The receiver 603 receives the stream data of the transport stream transmitted from the transmitter 601.

It is assumed here that the digital television broadcast system performs a byte interleave on a transmission transport stream packet. The depth of the interleave is 12 bytes, and a byte following a synchronization byte passes through a reference path without delay. To achieve this byte interleave, the transmitter 601 includes an interleaver 610, and the receiver 603 includes a deinterleaver 630.

It is to be noted that various processes are performed in a section corresponding to the channel 602 in a digital television broadcast; however, for the convenience of description, the processes are simplified.

Figure 40:
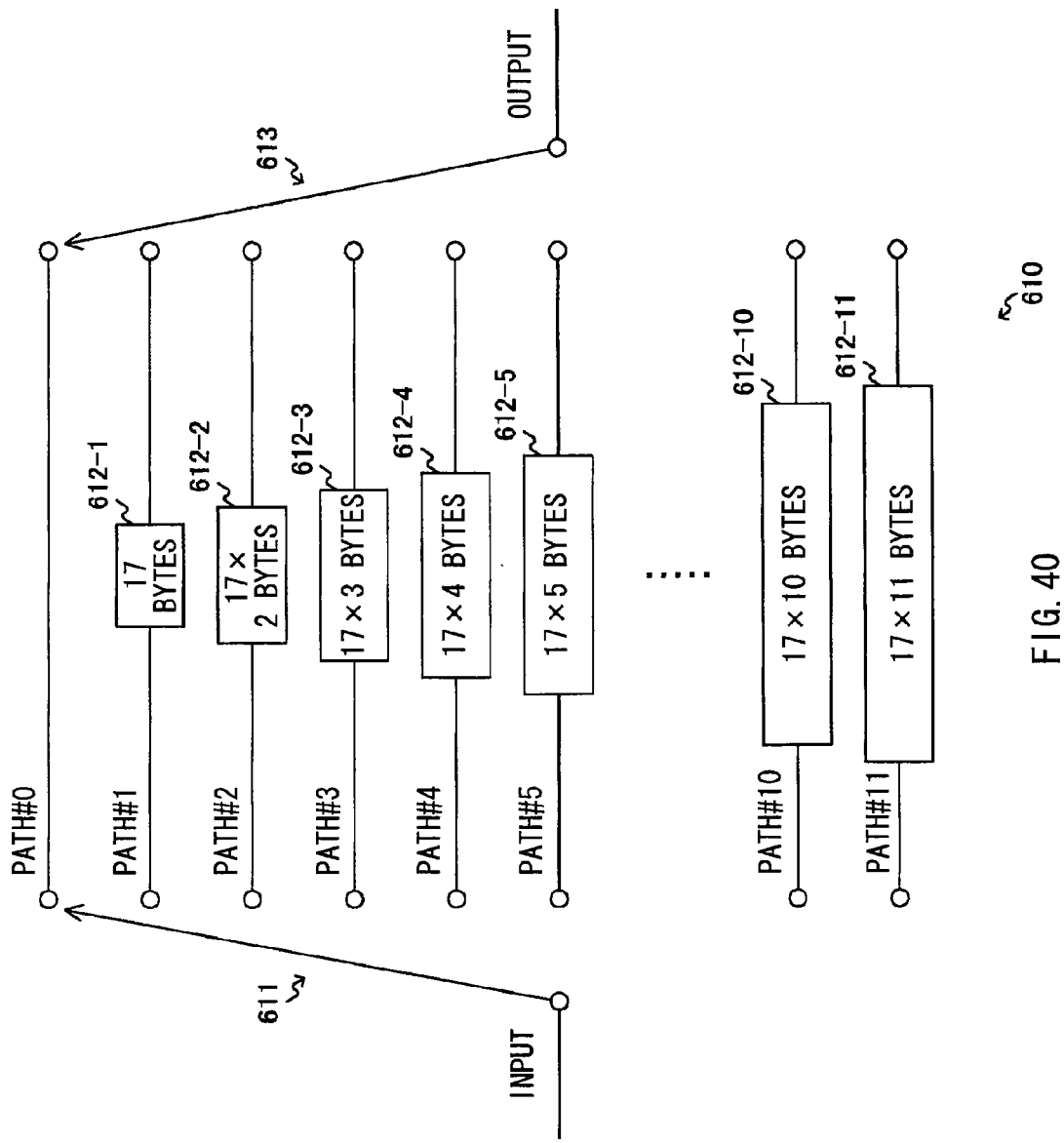
FIG. 40 is a diagram illustrating a configuration example of an interleaver in the application example of the embodiments of the invention.

FIG. 40 is a diagram illustrating a configuration example of the interleaver 610 in the application example of the embodiments of the invention. The interleaver 610 includes 12 paths #0 to #11, and switches 611 and 613 are switched concurrently with each other to allow data to pass through one of the paths. In the byte interleaver 610, switching is performed to allow data to pass through a path varying from one byte to another. In other words, switching from the path #0 to the path #1, from the path #1 to the path #2, and so on is performed sequentially until the path #11, and then switching from the path #11 to the path #0 is performed.

In this interleaver 610, the paths #1 to #11 of the twelve paths #0 to #11 include FIFOs 612-1 to 612-11, respectively. The FIFOs 612-1 to 612-11 are byte-by-byte shift registers, and have different lengths from one another. For example, the FIFO 612-1 on the path #1 has a length of 17 bytes, the FIFO 612-2 on the path #2 has a length of 34 (=17×2) bytes, the FIFO 612-3 on the path #3 has a length of 51 (=17×3) bytes.

FIG. 41 is a diagram illustrating a configuration example of the deinterleaver 630 in the application example of the embodiments of the invention. As in the case of the interleaver 610, the deinterleaver 630 includes 12 paths #0 to #11, and switches 631 and 633 are switched concurrently with each other to allow data to pass through one of the paths. In the byte deinterleaver 630, as in the case of the interleaver 610, switching is performed to allow data to pass through a path varying from one byte to another. In other words, switching from the path #0 to the path #1, from the path #1 to the path #2, and so on is performed sequentially until the path #11, and then switching from the path #11 to the path #0 is performed.

In the deinterleaver 630, the paths #0 to #10 of the twelve paths #0 to #11 include FIFOs 632-0 to 632-10, respectively. The FIFOs 632-0 to 632-10 are byte-by-byte shift registers, and have different lengths from one another. For example, the FIFO 632-0 on the path #0 has a length of 187 (=17×11) bytes, the FIFO 632-1 on the path #1 has a length of 170 (=17×10) bytes, and the FIFO 632-2 on the path #2 has a length of 153 (=17×9) bytes.

Assuming that dummy data is filled into the FIFOs 612 and 632 in the interleaver 610 and the deinterleaver 630, a process is performed on the FIFOs 612 and 632. Therefore, in an initial stage of the process, a process of evicting the dummy data is necessary.

It is obvious from a comparison between the interleaver 610 and the deinterleaver 630 that the lengths of the FIFOs in the paths of the interleaver 610 and the lengths of the FIFOs in the paths of the deinterlevaer 630 are determined to be paired with each other, and any of pairs of the paths is configured to have a length of 187 bytes in total. Therefore, a data sequence in an input of the interleaver 610 and a data sequence in an output of the deinterleaver 630 coincide with each other. On the other hand, even if a burst error occurs on the channel 602, a random data sequence causes a convenient state for error correction by an error-correction code in the receiver 603.

It is to be noted that such sequence change by the FIFOs is also applicable to a convolutional interleave such as time interleave in the digital television broadcast.

The FIFOs 612 and 632 in the interleaver 610 and the deinterleaver 630 are allowed to be achieved as shared FIFOs in the above-described embodiments of the invention. Both of the FIFOs 612 and 632 are not necessarily contained in the cache memory; therefore, the cache memory is allowed to be used depending on a processing status. In other words, in the case where a large number of cache lines are used for applications other than the FIFO, data is saved in the main memory, and in the case where a small number of cache lines are used for applications other than the FIFO, a state where the cache lines include data of the FIFO is maintained. Therefore, a process is allowed to be performed efficiently with a small cache capacity.

5. Modification Examples

Although the present invention is described referring to the embodiments, the invention is not limited thereto. For example, in the embodiments of the invention, it is assumed that the cache line size of the shared cache 200 is 64 bytes; however, the invention is not limited thereto. Moreover, in the embodiments of the invention, it is assumed that the shared cache 200 and the first level cache 110 have an equal cache line size, i.e., 64 bytes; however, the invention is not limited thereto, and they may have different cache sizes.

Further, in the embodiments of the invention, it is assumed that the shared cache 200 is a write-back system cache memory; however, the invention is not limited thereto, and the shared cache 200 may be any other system cache memory such as a write-through system cache memory.

Moreover, in the embodiments of the invention, it is assumed that data transfer between the first level cache 110 and the shared cache 200 is performed on a cache line size basis; however, the invention is not limited thereto, and transfer may be performed on an arbitrary size basis.

It is to be noted that the embodiments of the present invention are examples for embodying the present invention and, as defined in the embodiments of the present invention, the matters of the embodiments of the present invention correspond to specific matters of the claims. Similarly, specific matters of the claims correspond to matters of the embodiments of the present invention to which the same names are attached. However, the present invention is not limited to the embodiments and may be embodied by variously modifying the embodiments without departing from the scope of the present invention.

Moreover, each procedure described in the embodiments of the invention may be considered as a method including steps of the procedure, a program allowing a computer to execute the steps of the procedure, or a storage medium holding the program. Examples of this storage medium include a CD (Compact Disc), a MD (Mini Disc), a DVD (Digital Versatile Disk), a memory card, and a Blu-ray Disc (Registered Trademark).

The invention claimed is:

1. A cache memory comprising:
   a tag storage section including a plurality of entries each including a tag address and a remaining number of times for reference, one or more entries being retrieved for reference through searching the plurality of entries by a first address segment which configures part of an access address,
   wherein each of the plurality of entries includes a field indicating whether or not data in a cache line of the corresponding entry and data in a main memory are identical to each other;
   a data storage section configured to store pieces of data each corresponding to the plurality of entries;
   circuitry configured to:
   compare a second address-segment which configures another part of the access address with the tag address included in each of the one or more of the retrieved entries, thereby to find an entry having a tag address that matches the second address-segment; and
   select a piece of data corresponding to the found entry from the data storage section, in a read access,
   wherein, in the read access, the circuitry is configured to invalidate the found entry without performing a write-back operation after the read access in a case that the remaining number of times for reference included in the found entry is equal to one, whereas the circuitry is configured to decrement, by one, the remaining number of times for reference included in the found entry in a case that the remaining number of times for reference is greater than one, and
   wherein, upon the invalidation of the found entry, the circuitry is configured to set a value of the field to "0".

2. The cache memory according to claim 1, wherein upon execution of a write access, the circuitry is configured to perform control to save data to be written in the write access and the remaining number of times for reference into an external memory without accessing the data storage section, in a case that the remaining number of times for reference in each of the retrieved entries is greater than zero.

3. The cache memory according to claim 2, further comprising a pre-fetch control section configured to perform control to prefetch the saved data and the saved remaining number of times for reference from the external memory to the data storage section and the tag storage section, respectively, in a case that the data storage section has a free space.

4. The cache memory according to claim 2, further comprising a pre-fetch control section configured to perform control to prefetch the saved data from an external memory to the data storage section as well as to set the remaining number of times for reference in the tag storage section to one, in a case that the data storage section has a free space.

5. The cache memory according to claim 1, further comprising:

a valid bit included in each of the plurality of entries indicating a validity of the corresponding entry,
wherein, upon the invalidation of the found entry, the circuitry is configured to set a value of the valid bit to "0".

6. The cache memory according to claim 1, further comprising a region designation register configured to designate a specific region in the cache memory,
wherein, upon an execution of the read access in a case that the access address belongs to the specific region, the circuitry is configured to perform control to fetch data from an external memory, and set the remaining number of times for reference to "1".

7. A cache memory control unit comprising:
circuitry configured to:
store a plurality of entries, each including a tag address and a remaining number of times for reference, one or more entries being retrieved for reference through searching the plurality of entries by a first address segment which configures part of an access address,
wherein each of the plurality of entries includes a field indicating whether or not data in a cache line of the corresponding entry and data in a main memory are identical to each other; and
compare a second address-segment which configures another part of the access address with the tag address included in each of the one or more of the retrieved entries, thereby to find an entry having a tag address that matches the second address-segment;
wherein, in a read access,
the circuitry is configured to invalidate the found entry without performing a write-back operation after the read access in a case that the remaining number of times for reference included in the found entry is equal to one, and decrement, by one, the remaining number of times for reference included in the found entry in a case that the remaining number of times for reference is greater than one, and
wherein, upon the invalidation of the found entry, the circuitry is configured to set a value of the field to "0".

8. A cache memory comprising:
a tag storage section including a plurality of entries each including a tag address and a time-limitation flag indicating whether or not the entry is time-limited, one or more entries being retrieved for reference through searching the plurality of entries by a first address-segment which configures part of an access address,
wherein each of the plurality of entries includes a field indicating whether or not data in cache line of the corresponding entry and data in a main memory are identical to each other;
a data storage section configured to store pieces of data each corresponding to the plurality of entries, and a remaining number of times for reference of an entry including a time-limitation flag indicating that the entry is time-limited;
circuitry configured to:
compare a second address-segment which configures another part of the access address with the tag address included in each of the one or more of the retrieved entries, thereby to find an entry having a tag address that matches the second address-segment; and
select a piece of data corresponding to the found entry from the data storage section, in a read access,
wherein, in the read access,
the circuitry is configured to invalidate the found entry without performing a write-back operation after the read access, in a case that the found entry includes a time-limitation flag indicating that the entry is time-limited and in a case that the remaining number of times for reference included in the found entry is equal to one,
the circuitry is configured to decrement, by one, the remaining number of times for reference included in the found entry, in a case that the found entry includes the time-limitation flag indicating that the entry is time-limited and in a case that the remaining number of times for reference included in the found entry is greater than one, and
wherein, upon the invalidation of the found entry, the circuitry is configured to set a value of the field to "0".

9. The cache memory according to claim 8, wherein upon execution of a write access, the circuitry is configured to perform control to save data to be written in the write access and the remaining number of times for reference into an external memory without accessing the data storage section in a case that the remaining number of times for reference in each of the retrieved entries is greater than zero.

10. The cache memory according to claim 9, further comprising a pre-fetch control section configured to perform control to prefetch the saved data and the saved remaining number of times for reference from the external memory to the data storage section, in a case that the data storage section has a free space.

11. The cache memory according to claim 8, further comprising a region designation register configured to designate a specific region on the external memory,
wherein upon execution of a write access, the circuitry is configured to perform control to save data to be written in the write access into an external memory without accessing the data storage section, in a case that the access address belongs to the specific region and in a case that the remaining number of time for reference in each of the retrieved entries is greater than zero.

12. The cache memory according to claim 11, further comprising a pre-fetch control section configured to perform control to prefetch the saved data from the external memory to the data storage section as well as to set the remaining number of times for reference in the data storage section to one, in a case that the data storage section has a free space.

13. A cache memory comprising:
a tag storage section including a plurality of entries each including a tag address and a data amount field, one or more entries being retrieved for reference through searching the plurality of entries by a first address-segment which configures part of an access address;
a data storage section configured to store pieces of data each corresponding to the plurality of entries;
circuitry configured to:
compare a second address-segment which configures another part of the access address with the tag address included in each of the one or more of the retrieved entries, thereby to find an entry having a tag address that matches the second address-segment; and
write data-to-be-written to the found entry in the data storage section in write access, and select data corresponding to the found entry from the data storage section in a read access,
wherein, in the write access, the circuitry is configured to stay on standby until a free space is reserved based on a value of the data amount field included in the found entry, and add an amount of data written in the write access to the data amount field after the write access, in the read access, the circuitry is configured to stay on standby until an amount of data to be read in the read access is reserved based on the value of the data amount field included in the found entry, and subtract an amount of data read in the read access from the data amount field after the read access, and wherein, upon receiving a flush instruction during the read access, the circuitry is configured to set the value of the data amount field to "0".

14. The cache memory according to claim 13, wherein the circuitry, in a first mode, is configured to allow the amount of data to be added to the data amount field at a delay timing after the write access, the delay timing being a timing in a case that write accesses on a predetermined number of entries are completed.

15. The cache memory according to claim 14, wherein the circuitry is configured to add, in the first mode, the amount of data to the data amount field, upon receiving the flush instruction.

16. The cache memory according to claim 13, wherein the circuitry, in a second mode, is configured to allow a lock bit, indicating whether or not the corresponding entry is locked, to be locked at a delay timing after the write access, the delay timing being a timing in a case that write accesses on a predetermined number of entries are completed.

17. The cache memory according to claim 16, wherein the circuitry is configured to unlock, in the second mode, the lock bit, upon receiving the flush instruction.

18. The cache memory according to claim 13, wherein upon execution of the write access, the circuitry is configured to perform control to save data to be written in the write access and a write data amount into an external memory without accessing the data storage section in a case that the value of the data amount field in each of the retrieved entries is greater than zero or in a case that lock bits, indicating whether or not the corresponding entry is locked, in the all entries are locked.

19. A cache memory control unit comprising:
circuitry configured to:
store a plurality of entries each including a tag address and a data amount field, one or more entries being retrieved for reference through searching the plurality of entries by a first address-segment which configures part of an access address; and
compare a second address-segment which configures another part of the access address with the tag address included in each of the one or more of the retrieved entries, thereby to find an entry having a tag address that matches the second address-segment,
wherein, in write access, the circuitry is configured to stay on standby until a free space is reserved based on a value of the data amount field included in the found entry, and add an amount of data written in the write access to the data amount field after the write access,
in a read access, the circuitry is configured to stay on standby until an amount of data to be read in the read access is reserved based on the value of the data amount field included in the found entry, and subtract an amount of data read in the read access from the data amount field, and
wherein, upon receiving a flush instruction during the read access, the circuitry is configured to set the value of the data amount field to "0".

* * * * *